(12) United States Patent
Kim et al.

(10) Patent No.: US 12,472,388 B2
(45) Date of Patent: Nov. 18, 2025

(54) APPARATUS AND METHOD FOR CONTROLLING MOVEMENT OF ULTRASONIC WAVE GENERATING UNIT

(71) Applicant: JEISYS MEDICAL INC., Seoul (KR)

(72) Inventors: Eun Ho Kim, Seoul (KR); Kwang Hyeok Jung, Seoul (KR); Si Youn Kim, Seoul (KR); Dong Hwan Kang, Seoul (KR); Min Young Kim, Seoul (KR); Hyun Jin Kim, Seoul (KR); Kwang Ho Ryu, Seoul (KR)

(73) Assignee: JEISYS MEDICAL INC., Seoul (KR)

( * ) Notice: Subject to any disclaimer, the term of this patent is extended or adjusted under 35 U.S.C. 154(b) by 79 days.

(21) Appl. No.: 18/493,296

(22) Filed: Oct. 24, 2023

(65) Prior Publication Data

US 2024/0065676 A1 Feb. 29, 2024

Related U.S. Application Data

(63) Continuation of application No. PCT/KR2022/005956, filed on Apr. 26, 2022.

(30) Foreign Application Priority Data

Apr. 26, 2021 (KR) .......................... 10-2021-0053593
Apr. 1, 2022 (KR) .......................... 10-2022-0041326

(Continued)

(51) Int. Cl.
*A61N 7/02* (2006.01)
*A61N 7/00* (2006.01)

(52) U.S. Cl.
CPC ........ *A61N 7/02* (2013.01); *A61N 2007/0034* (2013.01); *A61N 2007/0091* (2013.01)

(58) Field of Classification Search
CPC .... A61N 2007/0082; A61N 2007/0091; A61N 2007/0034; A61B 8/4461
See application file for complete search history.

(56) References Cited

U.S. PATENT DOCUMENTS 8,523,849 B2    9/2013   Liu et al.
9,623,267 B2 *   4/2017   Ulric ........................ A61N 7/02
(Continued)

FOREIGN PATENT DOCUMENTS

JP     2012519549 A    8/2012
JP     2018500075 A    1/2018
(Continued)

OTHER PUBLICATIONS

International Search Report issued in PCT/KR2022/005956; mailed Aug. 1, 2022.

(Continued)

*Primary Examiner* — Colin T. Sakamoto

(57) ABSTRACT

The present disclosure relates to an apparatus for controlling movement of an ultrasonic wave generating unit, the apparatus characterized by comprising: a transfer unit for moving the ultrasonic wave generating unit; and a control unit for controlling the operation of the ultrasonic wave generating unit and the transfer unit, wherein the control unit controls the ultrasonic wave generating unit such that, when the ultrasonic wave generating unit moves, ultrasonic waves are irradiated at intervals to the skin on a movement path of the ultrasonic wave generating unit.

19 Claims, 22 Drawing Sheets

(30) Foreign Application Priority Data

Apr. 25, 2022 (KR) ........................ 10-2022-0050953
Apr. 25, 2022 (KR) ........................ 10-2022-0050967

(56) References Cited

U.S. PATENT DOCUMENTS

| | | | |
|---|---|---|---|
| 10,363,440 | B2 | 7/2019 | Cho et al. |
| 10,502,712 | B2 | 12/2019 | Hall |
| 2012/0029353 | A1* | 2/2012 | Slayton .................... A61N 7/00 601/2 |
| 2012/0165848 | A1 | 6/2012 | Slayton et al. |
| 2012/0226268 | A1 | 9/2012 | Liu et al. |
| 2014/0005756 | A1 | 1/2014 | Liu et al. |
| 2016/0001097 | A1* | 1/2016 | Cho ......................... A61B 8/44 601/3 |
| 2017/0303895 | A1* | 10/2017 | Park ........................ A61N 7/02 |
| 2019/0366129 | A1* | 12/2019 | Park ........................ A61N 7/02 |
| 2020/0086145 | A1 | 3/2020 | Yoo et al. |

FOREIGN PATENT DOCUMENTS

| | | |
|---|---|---|
| JP | 2020505116 A | 2/2020 |
| KR | 10-1335476 B1 | 12/2013 |
| KR | 10-2014-0020266 B1 | 2/2014 |
| KR | 10-1577037 B1 | 12/2015 |
| KR | 10-1677903 B1 | 11/2016 |
| KR | 20160145752 A | 12/2016 |
| KR | 10-1756618 B1 | 7/2017 |
| KR | 10-2018-0015095 A | 2/2018 |
| KR | 10-1893584 B1 | 8/2018 |
| KR | 10-1964387 B1 | 4/2019 |
| KR | 10-2078651 B1 | 2/2020 |
| KR | 10-2020-0030838 A | 3/2020 |
| KR | 10-2111103 B1 | 5/2020 |
| KR | 102143977 B1 | 8/2020 |
| KR | 10-2168246 B1 | 10/2020 |

OTHER PUBLICATIONS

Korean Intellectual Property Office, Request for the Submission of an Opinion regarding Application No. 10-2022-0041326, Jun. 1, 2024.

Korean Intellectual Property Office, Request for the Submission of an Opinion regarding Application No. 10-2022-0050953, Jul. 29, 2024.

Korean Intellectual Property Office, Request for the Submission of an Opinion regarding Application No. 10-2022-0050967, Jul. 29, 2024.

European Search Report regarding Application No. EP 22796107, Jul. 24, 2024.

Japanese Patent Office, Notice of Reasons for Refusal regarding Application No. 2023-565876, Aug. 30, 2024.

* cited by examiner (a) Move from first point (A) to second point (B)

(b) Move from second point (B) to first point (A)

(a) Move from first point (A) to second point (B)

(b) Move from second point (B) to first point (A)

(a) Move from first point (A) to second point (B)

(b) Move from second point (B) to first point (A)

(c) Move from first point (A) to second point (B)

(a) Move from first point (A) to second point (B)

(b) Move from second point (B) to first point (A)

(c) Move from first point (A) to second point (B)

(a) Move from first point (A) to second point (B)

(b) Move from second point (B) to first point (A)

(c) Move from first point (A) to second point (B)

APPARATUS AND METHOD FOR CONTROLLING MOVEMENT OF ULTRASONIC WAVE GENERATING UNIT

CROSS-REFERENCE TO RELATED APPLICATIONS

The present application is a continuation of International Patent Application No. PCT/KR2022/005956, filed on Apr. 26, 2022, which is based upon and claims the benefit of priority to Korean Patent Application Nos. 10-2021-0053593 filed on Apr. 26, 2021, 10-2022-0041326 filed on Apr. 1, 2022, 10-2022-0050953 filed on Apr. 25, 2022 and 10-2022-0050967 filed on Apr. 25, 2022. The disclosures of the above-listed applications are hereby incorporated by reference herein in their entirety.

BACKGROUND

Embodiments of the inventive concept described herein relate to an apparatus and method for controlling the movement of an ultrasonic wave generating unit, and more particularly, relate to an apparatus and method for controlling the movement of an ultrasonic wave generating unit using high-intensity focused ultrasound (HIFU).

Ultrasound refers to waves having a frequency of 20 KHz or higher and has the property of penetrating water, and thus is widely used in a medical field, including ultrasonic diagnostic devices and ultrasonic ultrasound examination devices.

In the medical field, ultrasound is typically used in ultrasonic imaging devices that utilize the transmission and reflection properties of ultrasound. For example, there is a device that obtains cross-sectional images within a human body by visualizing the time and intensity at which ultrasonic waves are reflected while the ultrasonic waves penetrate each organ in the human body.

Moreover, there may be provided a device that burns and removes specific subcutaneous tissues such as tumors within skin by using heat generated by HIFU or produces skin beautification or skin shaping effects such as wrinkle improvement by causing skin tissue degeneration and regeneration.

However, a conventional ultrasonic wave generating device generates heat by non-invasively focusing energy on selected areas without causing damages to a skin surface (i.e., by focusing the irradiated ultrasonic waves on a focal point that is several specific points), thereby causing a rapid rise in temperature in an area irradiated by ultrasonic waves.

Accordingly, because a doctor needs to carefully perform ultrasound examination, the conventional ultrasonic wave generating device has limitations in shortening an ultrasonic wave irradiation time and has limitations in maximizing ultrasonic wave irradiation effects.

Furthermore, the conventional ultrasonic wave generating device causes a risk of burns when high heat and high ultrasonic energy are applied to a skin surface.

Besides, it may be difficult for the conventional ultrasonic wave generating device to irradiate ultrasonic waves a deep part of skin using ultrasonic surface waves, and to irradiate ultrasonic waves to a large area at once.

Also, while an ultrasonic wave generating unit is moving, the ultrasonic wave generating unit may be separated from the conventional ultrasonic wave generating device.

In addition, the conventional ultrasonic wave generating device may cause burns by focusing the ultrasound output from a transducer on a specific area of a skin.

SUMMARY

Embodiments of the inventive concept provide an apparatus that maximizes ultrasonic wave irradiation effects while shortening an ultrasonic wave irradiation time.

Embodiments of the inventive concept provide an apparatus that prevents the risk of burns in advance.

Embodiments of the inventive concept provide an apparatus that irradiates ultrasonic surface waves to a deep part of skin and irradiates ultrasonic waves to a relatively large area in the deep part of skin at once.

Embodiments of the inventive concept provide an apparatus that prevents an ultrasonic wave generating unit from being separated while the ultrasonic wave generating unit is moving.

Embodiments of the inventive concept provide an apparatus that prevents burns caused by focusing ultrasonic waves output from a transducer on a specific area of a skin.

Problems to be solved by the inventive concept are not limited to the problems mentioned above, and other problems not mentioned will be clearly understood by those skilled in the art from the following description.

According to an embodiment, a movement controlling apparatus of an ultrasonic wave generating unit includes a transfer unit that moves the ultrasonic wave generating unit and a control unit that controls operations of the ultrasonic wave generating unit and the transfer unit. The control unit controls the ultrasonic wave generating unit such that, when the ultrasonic wave generating unit moves, ultrasonic waves are irradiated at intervals to a skin on a movement path of the ultrasonic wave generating unit.

Moreover, the control unit may include a memory in which ultrasonic wave irradiation location information of the ultrasonic wave generating unit is set in advance for each irradiation mode, and a processor that controls the ultrasonic wave generating unit such that the ultrasonic waves are radiated at the intervals to the skin on the movement path of the ultrasonic wave generating unit, based on ultrasonic wave irradiation location information corresponding to an irradiation mode, which is activated, among the irradiation mode when the ultrasonic wave generating unit moves.

Furthermore, the transfer unit may move the ultrasonic wave generating unit in a predetermined pattern. The predetermined pattern may include a pattern in which the ultrasonic wave generating unit moves back and forth between a first point and a second point. The processor may control the ultrasonic wave generating unit such that ultrasonic waves under the same conditions or ultrasonic waves under different conditions are output to the same irradiation point when the ultrasonic wave generating unit moves back and forth.

Besides, the transfer unit may move the ultrasonic wave generating unit in a predetermined pattern. The predetermined pattern may include a pattern in which the ultrasonic wave generating unit moves back and forth between a first point and a second point. The processor may control the ultrasonic wave generating unit such that ultrasonic waves under the same conditions or ultrasonic waves under different conditions are output to different irradiation points from each other when the ultrasonic wave generating unit moves back and forth.

Also, a plurality of first irradiation points at a point in time when the ultrasonic wave generating unit moves from a first point to a second point may be different from a plurality of second irradiation points at a point in time when the ultrasonic wave generating unit moves from the second point to the first point.

In addition, the control unit may allow the ultrasonic wave generating unit to continuously irradiate ultrasonic waves during a reciprocating movement, and may allow the ultrasonic wave generating unit to have an idle period, in which irradiation of the ultrasonic waves is stopped for a predetermined period, in a turning section within the reciprocating movement.

Moreover, the control unit may allow the ultrasonic wave generating unit to continuously irradiate ultrasonic waves when the ultrasonic wave generating unit moves from a first point to a second point, and to continuously irradiate ultrasonic waves while the ultrasonic wave generating unit has the idle period when the ultrasonic wave generating unit moves from the second point to the first point.

Furthermore, when the ultrasonic wave generating unit moves back from the first point to the second point, the control unit may further allow the ultrasonic wave generating unit to continuously irradiate ultrasonic waves while the ultrasonic wave generating unit has the idle period.

Besides, the apparatus may further include a cartridge housing in which the ultrasonic wave generating unit is provided, a hand piece on which the cartridge housing is detachably mounted and in which a first driving device is provided, a main shaft coupled to the ultrasonic wave generating unit such that the ultrasonic wave generating unit moves back and forth in a horizontal direction parallel to a bottom of the cartridge housing, and a vertical direction perpendicular to the bottom of the cartridge housing, an auxiliary shaft, which is accommodated in the cartridge housing, which is positioned to be parallel to the main shaft, and which guides the ultrasonic wave generating unit such that the ultrasonic wave generating unit moves in the vertical direction and the horizontal direction, and a guide provided in the vertical direction between the hand piece and a movable plate. The guide may guide the movable plate such that the movable plate is capable of moving in a vertical direction by a second driving device provided inside the hand piece while the ultrasonic wave generating unit irradiates the ultrasonic waves.

Also, the apparatus may further include an ultrasonic wave generation module that generates the ultrasonic waves, a moving shaft that moves the ultrasonic wave generation module, an adapter provided on the moving shaft, a hook groove recessed in one of the ultrasonic wave generation module and the adapter, and at least one hook protruding from the other of the adapter and the ultrasonic wave generation module and coupled to the hook groove.

In addition, the apparatus may further include a first magnetic member provided in the ultrasonic wave generation module, and a second magnetic member provided in a front end part of the moving shaft and coupled to the first magnetic member by magnetic force. The adapter may include the second magnetic member and is detachably coupled to the front end part of the moving shaft.

Moreover, the ultrasonic wave generation module may include a mounter detachably coupled to the moving shaft and a transducer provided on the mounter and generating ultrasonic waves.

Furthermore, the apparatus may further include a driving unit that moves the moving shaft. The control unit may control the transducer and the driving unit.

Besides, the control unit may control the driving unit and the transducer such that the transducer outputs ultrasonic waves at regular intervals to a target site of skin to form a plurality of damaged areas while the transducer moves back and forth. Also, the control unit may control the driving unit and the transducer such that the transducer continuously outputs ultrasonic waves to a target site of skin to form a single damaged area while the transducer moves back and forth.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
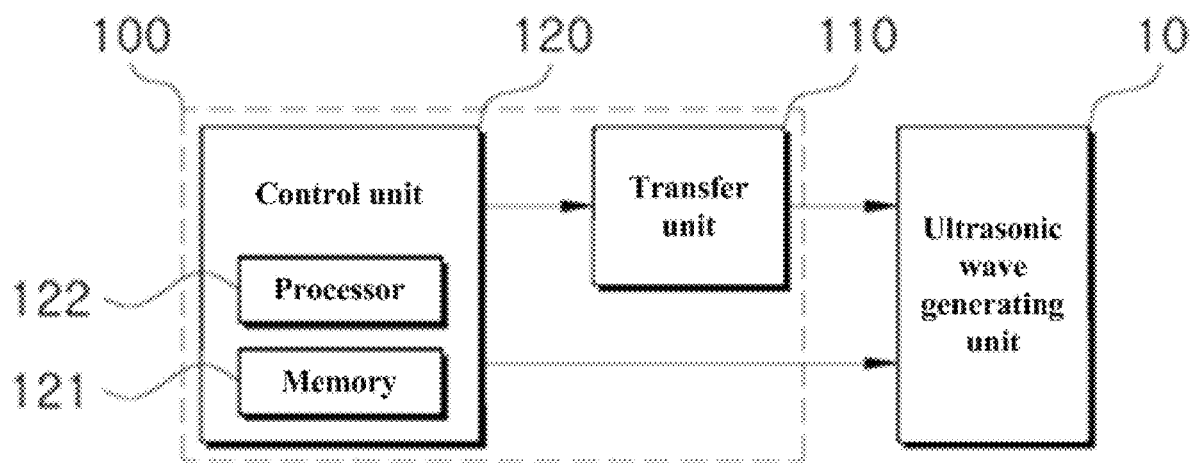
FIG. 1 is a diagram illustrating an example of a configuration of a movement controlling apparatus of an ultrasonic wave generating unit, according to an embodiment of the inventive concept.

The same reference numerals denote the same elements throughout the inventive concept. The inventive concept does not describe all elements of embodiments. Well-known content or redundant content in which embodiments are the same as one another will be omitted in a technical field to which the inventive concept belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the inventive concept will be described with reference to the accompanying drawings.

First of all, a HIFU technology refers to the latest thermoablation ultrasonic wave irradiation technology for burning specific subcutaneous tissues, such as tumors within the skin using heat generated when high-intensity ultrasonic waves are focused on a single point within the skin. This is a similar principle to lighting a fire by collecting warm sunlight with a magnifying glass. Because ultrasonic waves easily pass through body tissues, HIFU treatment is performed completely in a non-invasive manner without the use of knives or even needles. In other words, the HIFU treatment refers to a method of treating specific subcutaneous tissues, such as tumors, by burning the specific subcutaneous tissues after an ultrasonic wave irradiation area of a patient's skin is in close contact with an ultrasound generation surface. In addition, the HIFU treatment is being currently used to treat uterine fibroids, bone metastases, prostate cancer, breast cancer, pancreatic cancer, liver cancer, and kidney cancer.

As such, a HIFU technology may be implemented through an ultrasonic wave generating device. An ultrasonic wave generating device may irradiate ultrasonic energy to the patient's skin surface.

In this specification, a control unit of a movement controlling apparatus of an ultrasonic wave generating unit includes all various devices capable of providing results to a user by performing arithmetic processing. For example, the control unit of the movement controlling apparatus of the ultrasonic wave generating unit according to an embodiment of the inventive concept may include a computer, a server device, and a portable terminal, or may be in any one form thereof.

Here, for example, the computer may include a notebook computer, a desktop, a laptop, a tablet PC, a slate PC, or the like, which is equipped with a web browser.

The server device may be a server that processes information by communicating with an external device, and may include an application server, a computing server, a database server, a file server, a mail server, a proxy server, and a web server.

The portable terminal may be, for example, a wireless communication device ensuring portability and mobility, and may include all types of handheld-based wireless communication devices such as a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-code division multiple access (W-CDMA), and wireless broadband internet (Wibro) terminal, a smart phone, or the like, and wearable devices such as a timepiece, a ring, a bracelet, an anklet, a necklace, glasses, a contact lens, or a head-mounted-device (HMD).

The movement controlling apparatus of the ultrasonic wave generating unit according to an embodiment of the inventive concept may maximize the ultrasonic wave irradiation effect while shortening the ultrasonic wave irradiation time.

Moreover, a movement controlling apparatus of an ultrasonic wave generating unit according to an embodiment of the inventive concept prevents the risk of burns in advance.

Hereinafter, the movement controlling apparatus of an ultrasonic wave generating unit will be described in detail.

Figure 2:
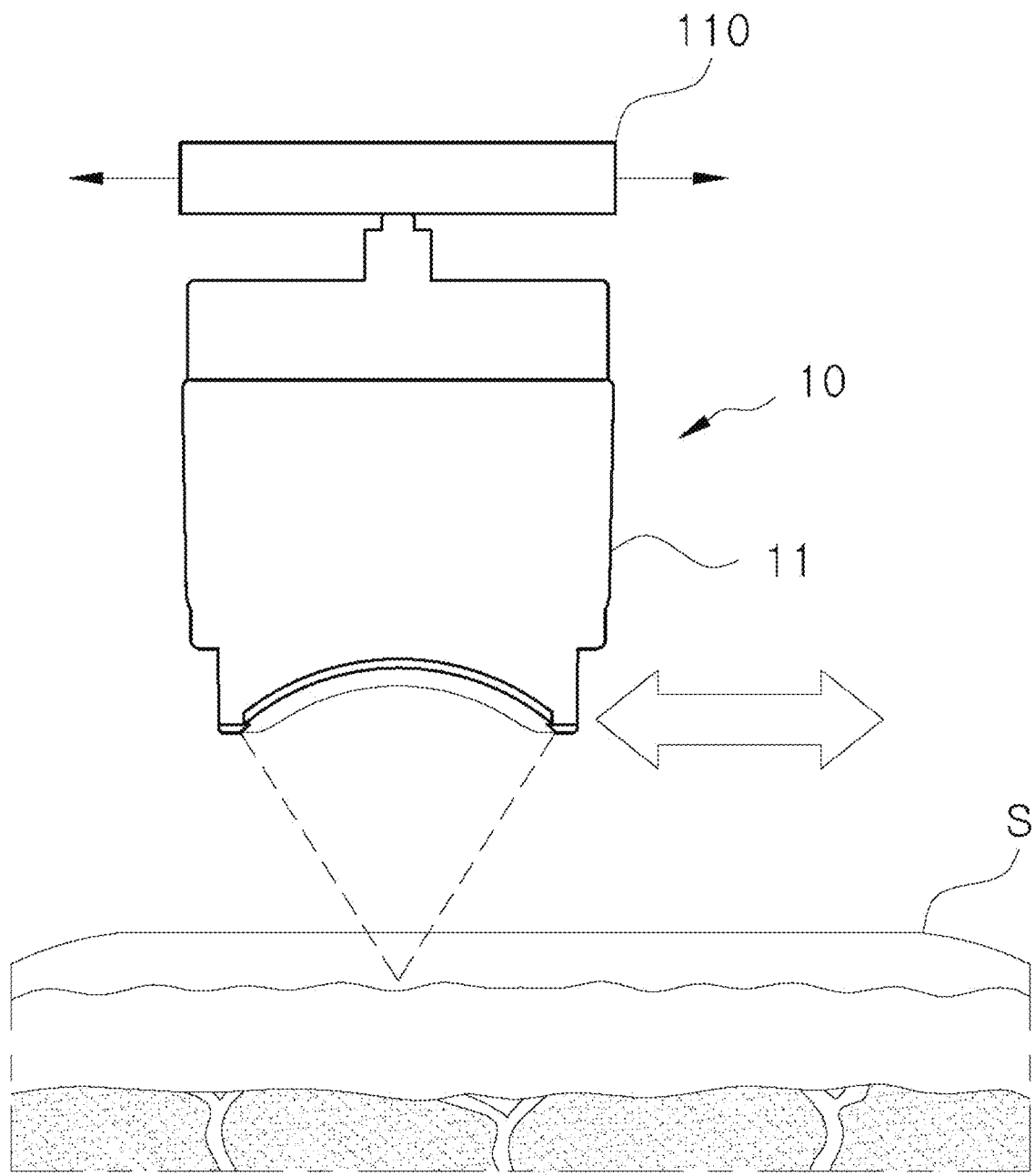
FIG. 2 is a diagram illustrating an example of a process in which the ultrasonic wave generating unit of FIG. 1 is moved.

FIG. 1 is a diagram illustrating an example of a configuration of a movement controlling apparatus of an ultrasonic wave generating unit, according to an embodiment of the inventive concept. FIG. 2 is a diagram illustrating an example of a process in which the ultrasonic wave generating unit of FIG. 1 is moved.

Referring to FIGS. 1 and 2, the movement controlling apparatus 100 of the ultrasonic wave generating unit 10 may include a transfer unit 110 and a control unit 120. The transfer unit 110 may be used to move the ultrasonic wave generating unit 10 to the left or right, and may be provided to support the ultrasonic wave generating unit 10. The transfer unit 110 may move the ultrasonic wave generating unit 10 to the left or right under control of the control unit 120. While maintaining an ultrasonic focusing depth by moving the transfer unit 110, the ultrasonic wave generating unit 10 having the transducer 11 may be moved to the left or right in a horizontal direction. The ultrasonic wave generating unit 10 may irradiate ultrasonic waves to a skin (S) on a movement path of the transfer unit 110.

Figure 3:
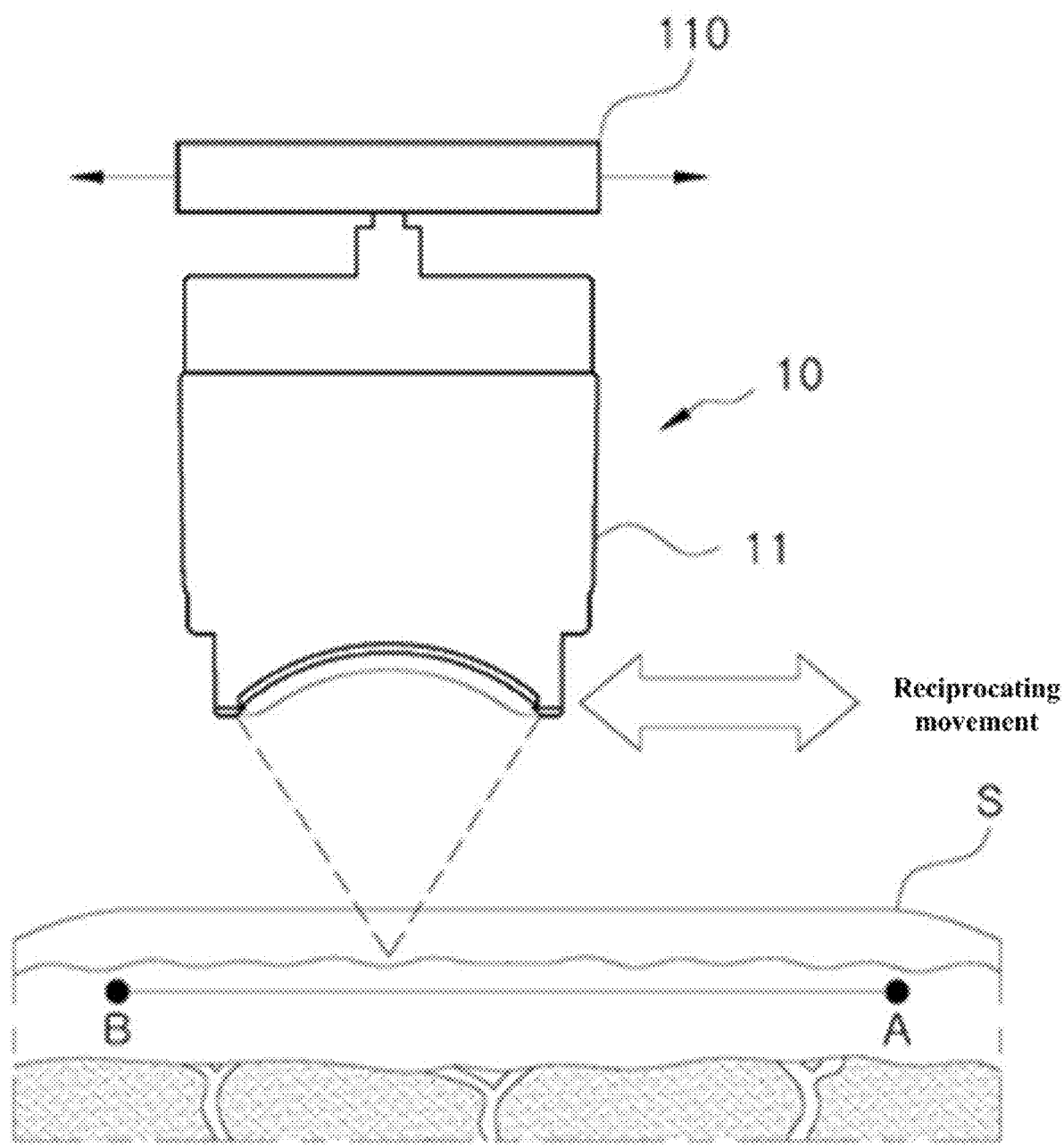
FIG. 3 is a diagram illustrating an example of a reciprocating pattern of the ultrasonic wave generating unit of FIG. 2.

FIG. 3 is a diagram illustrating an example of a reciprocating pattern of the ultrasonic wave generating unit of FIG. 2.

Referring to FIG. 3, the transfer unit 110 may move the ultrasonic wave generating unit 10 in a predetermined pattern. The predetermined pattern may include a pattern in which the ultrasonic wave generating unit 10 moves between first point (A) and second point (B). Information about the pattern in which the ultrasonic wave generating unit 10 moves between first point (A) and second point (B) may be stored in a memory 121.

The control unit 120 may be implemented as the memory 121, which stores data for an algorithm for controlling operations of components in the apparatus or a program implementing the algorithm, and at least one processor 122 that performs the above-described operation using the data stored in the memory 121. Here, the memory 121 and the processor 122 may be implemented as separate chips. Moreover, the memory 121 and the processor 122 may be implemented as a single chip.

The memory 121 may store data supporting various functions of this apparatus and programs for the operation of the control unit, may store input/output data, and may store a plurality of application programs (or applications) running on the apparatus, data for operation of the apparatus, and commands. At least part of the application programs may be downloaded from an external server through wireless communication.

The memory 121 may include the type of a storage medium of at least one of a flash memory type, hard disk type, a solid state disk (SSD) type, a silicon disk drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. In addition, the memory 121 may be separated from the apparatus, but may be a database connected by wire or wirelessly.

In the memory 121, the ultrasonic wave irradiation location information of the ultrasonic wave generating unit 10 may be set in advance for each irradiation mode. Here, the ultrasonic wave irradiation location information for each irradiation mode may be respective ultrasonic wave irradiation location information corresponding to irradiation modes with different irradiation methods. The respective ultrasonic wave irradiation location information may be location information for focusing ultrasonic waves of the ultrasonic wave generating unit 10. The respective ultrasonic wave irradiation location information may be obtained by a Hall sensor (not shown) provided in the ultrasonic wave generating unit 10 and capable of detecting a location for focusing ultrasonic waves, and may be stored in advance in the memory 121. Besides, the respective ultrasonic wave irradiation location information may be obtained by all means capable of obtaining a location for focusing ultrasonic waves.

While the ultrasonic wave generating unit 10 is moves, the processor 122 may control the ultrasonic wave generating unit 10 based on ultrasonic wave irradiation location information corresponding to the activated irradiation mode among irradiation modes such that ultrasonic waves are irradiated at intervals to a skin on a movement path of the ultrasonic wave generating unit 10.

Figure 4:
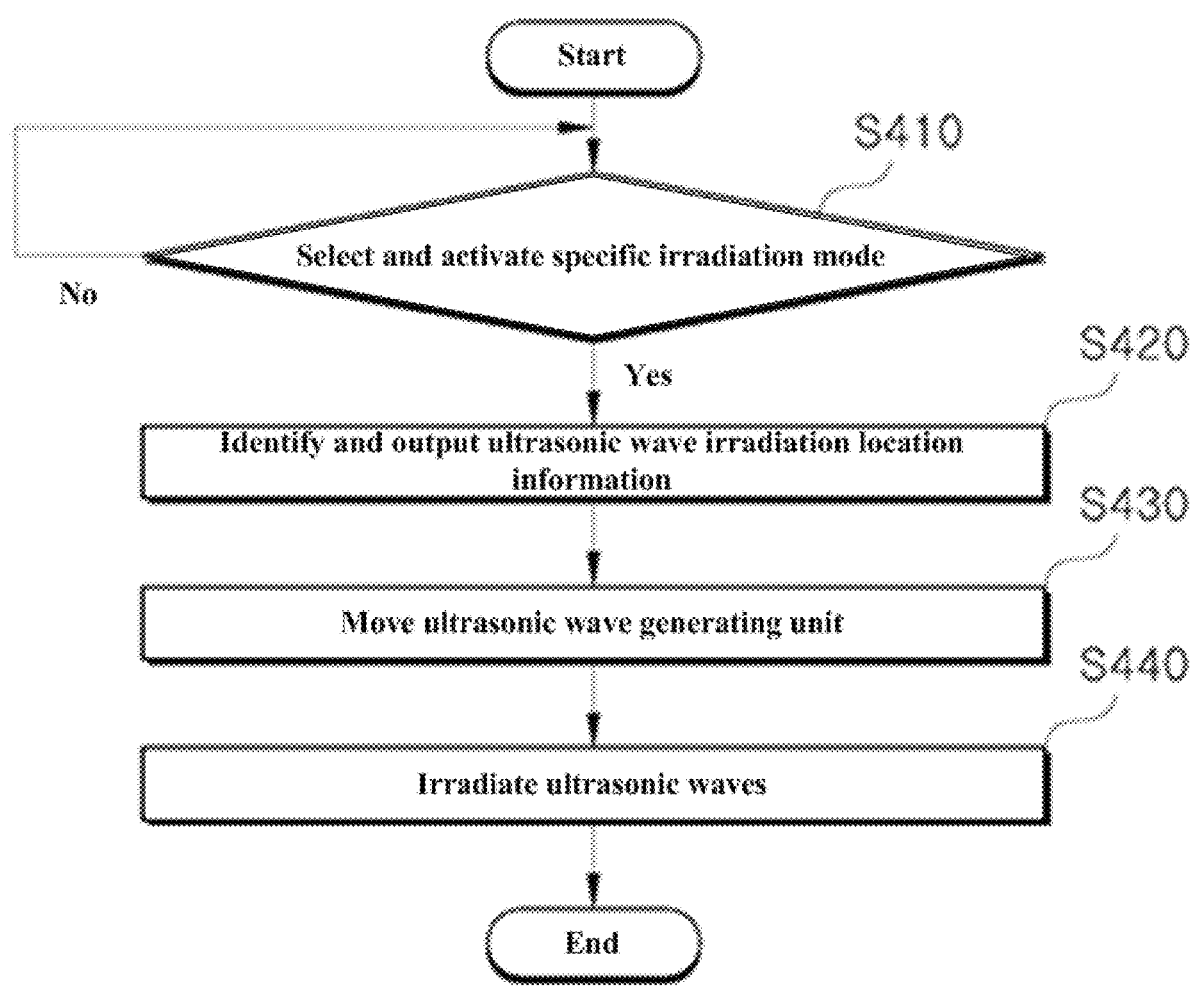
FIG. 4 is a flowchart illustrating an example of a method for controlling movement of an ultrasonic wave generating unit, according to an embodiment of the inventive concept.

FIG. 4 is a flowchart illustrating an example of a method for controlling movement of an ultrasonic wave generating unit, according to an embodiment of the inventive concept.

Referring to FIG. 4, a method of controlling the movement of the ultrasonic wave generating unit may include a specific irradiation mode determining step S410, an ultrasonic wave irradiation location information outputting step S420, an ultrasonic wave generating unit moving step S430, and an ultrasonic wave irradiating step (S440).

The specific irradiation mode determining step may include determining, through the processor 122, whether a specific irradiation mode among the irradiation modes of the ultrasonic wave generating unit 10 is selected and activated (S410). The processor 122 may determine whether each irradiation mode for outputting ultrasonic waves of the ultrasonic wave generating unit 10 in different irradiation methods is activated.

The ultrasonic wave irradiation location information outputting step may include identifying and outputting, through the processor 122, ultrasonic wave irradiation location information corresponding to a specific irradiation mode when the specific irradiation mode among the irradiation modes of the ultrasonic wave generating unit 10 is activated (S420). Here, the ultrasonic wave irradiation location information may be respective ultrasonic wave irradiation location information corresponding to irradiation modes with different irradiation methods. The respective ultrasonic wave irradiation location information may be location information for focusing ultrasonic waves of the ultrasonic wave generating unit 10.

The ultrasonic wave generating unit moving step may include moving, through the processor 122, the ultrasonic wave generating unit 10 in a predetermined pattern through the transfer unit 110 based on the ultrasonic wave irradiation location information output (S430). The predetermined pattern may include a pattern in which the ultrasonic wave generating unit 10 moves between first point (A) and second point (B).

The ultrasonic energy irradiating step may include controlling, through the processor 122, the ultrasonic wave generating unit 10 such that ultrasonic waves are irradiated at intervals to the skin (S) on a movement path of the ultrasonic wave generating unit 10 when the ultrasonic wave generating unit 10 is moved in a predetermined pattern through the transfer unit 110 (S440).

Figure 5:
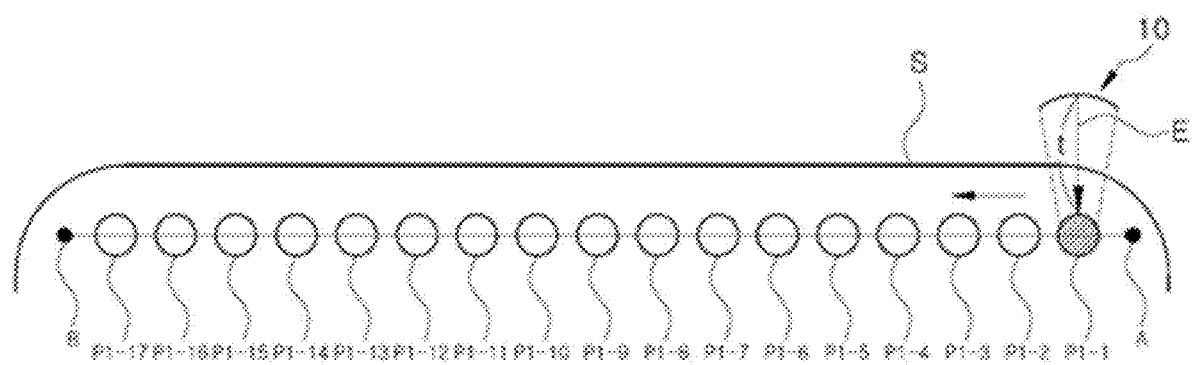
FIG. 5 is a diagram illustrating an example of a movement process of the ultrasonic wave generating unit when a first irradiation mode among irradiation modes of the processor in FIG. 1 is activated.
Figure 5:
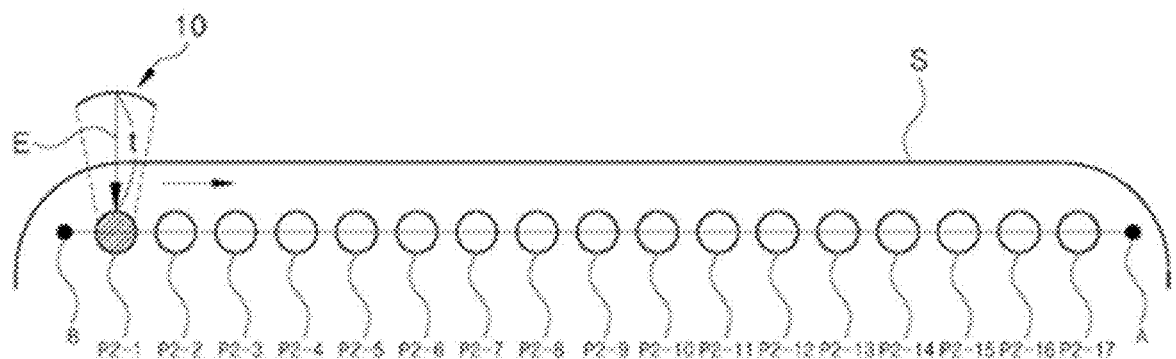

FIG. 5 is a diagram illustrating an example of a movement process of the ultrasonic wave generating unit when a first irradiation mode among irradiation modes of the processor in FIG. 1 is activated.

Referring to FIG. 5, a specific irradiation mode determining step may include determining, through the processor 122, whether a first irradiation mode among the irradiation modes of the ultrasonic wave generating unit 10 is selected and activated (S410).

The ultrasonic wave irradiation location information outputting step may include identifying and outputting, through the processor 122, first ultrasonic wave irradiation location information corresponding to the first irradiation mode when the first irradiation mode among the irradiation modes of the ultrasonic wave generating unit 10 is activated (S420). The first ultrasonic wave irradiation location information may be respective location information for focusing ultrasonic waves of the ultrasonic wave generating unit 10.

The first ultrasonic wave irradiation location information may be information for outputting ultrasonic waves under the same conditions or ultrasonic waves under different conditions at the same irradiation location when the ultrasonic wave generating unit 10 moves back and forth. Here, the condition may include at least one of a time during which irradiation of ultrasonic energy is maintained and the intensity of ultrasonic energy.

The first ultrasonic wave irradiation location information may be information for outputting ultrasonic waves to each of irradiation locations (P1-1 to P1-17) (P2-1 to P2-17) when the ultrasonic wave generating unit 10 moves from first point (A) to second point (B) or from second point (B) to first point (A).

Here, irradiation location P2-1 may be the same as irradiation location P1-17, and an irradiation location in a direction (P2-2→P2-17) may be the same as an irradiation location in a direction (P1-16→P1-1).

Moreover, intensity (E) of ultrasonic energy output to P1-1 to P1-17 may be the same as or different from intensity (E) of ultrasonic energy output to P2-1 to P2-17.

Furthermore, time (t) during which irradiation of ultrasonic energy output to P1-1 to P1-17 is maintained may be the same as or different from time (t) during which irradiation of ultrasonic energy output to P2-1 to P2-17. For example, time (t) during which irradiation of ultrasonic energy output to P1-1 to P1-17 is maintained is shorter or longer than time (t) during which the irradiation of ultrasonic energy output to P2-1 to P2-17 is maintained.

The ultrasonic wave generating unit moving step may include moving, through the processor 122, the ultrasonic wave generating unit 10 to each of the irradiation locations (P1-1 to P1-17) (P2-1 to P2-17) corresponding to the first ultrasonic wave irradiation location information through the transfer unit 110 based on the first ultrasonic wave irradiation location information output (S430).

The ultrasonic wave irradiating step may include controlling, through the processor 122, the ultrasonic wave generating unit 10 so as to irradiate ultrasonic waves at intervals to the skin (S) on a movement path through the ultrasonic wave generating unit 10 when the ultrasonic wave generating unit 10 moves to each of the irradiation locations (P1-1 to P1-17) (P2-1 to P2-17) through the transfer unit 110 (S440).

Here, an ultrasonic focusing depth when the ultrasonic wave generating unit 10 moves from first point (A) to second point (B) may be different from an ultrasonic focusing depth when the ultrasonic wave generating unit 10 moves from second point (B) to first point (A). For example, the ultrasonic focusing depth when the ultrasonic wave generating unit 10 moves from first point (A) to second point (B) may be deeper or shallower than the ultrasonic focusing depth when the ultrasonic wave generating unit 10 moves from second point (B) to first point (A).

Furthermore, under control of the processor 122, intensity (E) of ultrasonic energy output to P1-1 to P1-17 may be the same as or different from intensity (E) of ultrasonic energy output to P2-1 to P2-17.

Also, under control of the processor 122, intensity (E) of ultrasonic energy output to at least one of P2-1 and P2-2 may be weakened to prevent burns from occurring at a point close to a return point when the ultrasonic wave generating unit 10 moves from second point (B) to first point (A). Because a temperature after ultrasonic waves are irradiated does not drop a lot at a point close to the return point, intensity (E) of ultrasonic energy output to at least one of P2-1 and P2-2 may be weak under control of the processor 122.

Besides, under control of the processor 122, time (t) during which irradiation of ultrasonic energy output to P1-1 to P1-17 is maintained may be the same as or different from time (t) during which irradiation of ultrasonic energy output to P2-1 to P2-17. For example, under control of the processor 122, time (t) during which irradiation of ultrasonic energy output to P1-1 to P1-17 is maintained is shorter than or longer than time (t) during which the irradiation of ultrasonic energy output to P2-1 to P2-17 is maintained.

Also, under control of the processor 122, time (t) during which irradiation of ultrasonic energy output to at least one of P2-1 and P2-2 is maintained may be short to prevent burns from occurring at a point close to a return point when the ultrasonic wave generating unit 10 moves from second point (B) to first point (A). Because a temperature after ultrasonic waves are irradiated does not drop a lot at a point close to the return point, time (t) during which irradiation of ultrasonic energy output to at least one of P2-1 and P2-2 is maintained may be short under control of the processor 122.

Moreover, under control of the processor 122, time (t), during which irradiation of ultrasonic energy output to P1-1 to P1-17 is maintained, and intensity (E) of ultrasonic energy output to P1-1 to P1-17 may be the same as each other when the ultrasonic wave generating unit 10 moves from first point (A) to second point (B). Afterward, when the ultrasonic wave generating unit 10 moves from second point (B) to first point (A), under control of the processor 122, intensity (E) of ultrasonic energy output to P2-1 to P2-17 may be gradually high, and time (t), during which irradiation of ultrasonic energy is maintained may be gradually lengthened.

Furthermore, when the ultrasonic wave generating unit 10 moves from first point (A) to second point (B), intensity (E) of ultrasonic energy output to P1-1 to P1-17 may be gradually low under control of the processor 122. When the ultrasonic wave generating unit 10 moves from second point (B) to first point (A), intensity (E) of ultrasonic energy output to P2-1 to P2-17 may be gradually high under control of the processor 122. Accordingly, a temperature may not rise above a reference temperature.

Also, time (t) during which the irradiation of ultrasonic energy output to P1-1 to P1-17 or P2-1 to P2-17 is maintained may be short under control of the processor 122, and thus the temperature is increased again before the temperature decreases. Accordingly, the ultrasonic wave irradiation effect may be improved.

When the first irradiation mode is activated, the movement controlling apparatus 100 of the ultrasonic wave generating unit may maximize the effect of ultrasonic wave irradiation while shortening the ultrasonic wave irradiation time and may prevent the risk of burns.

Figure 6:
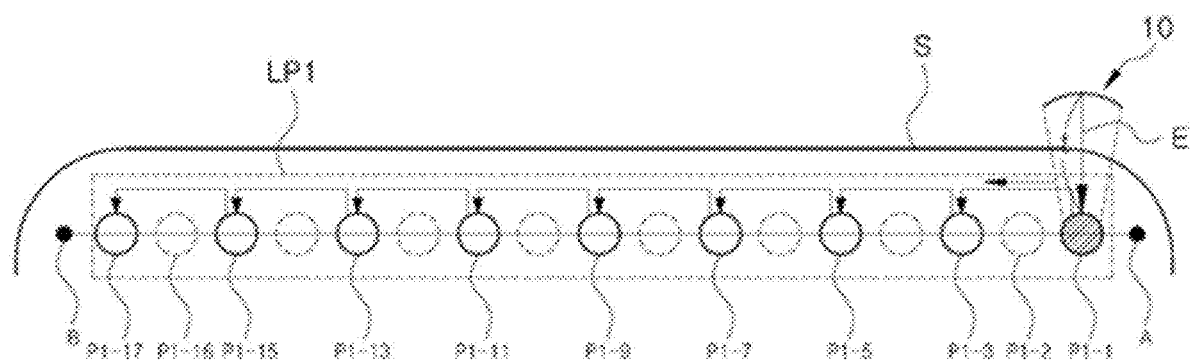
FIG. 6 is a diagram illustrating an example of a movement process of the ultrasonic wave generating unit when a second irradiation mode among irradiation modes of the processor in FIG. 1 is activated.
Figure 6:
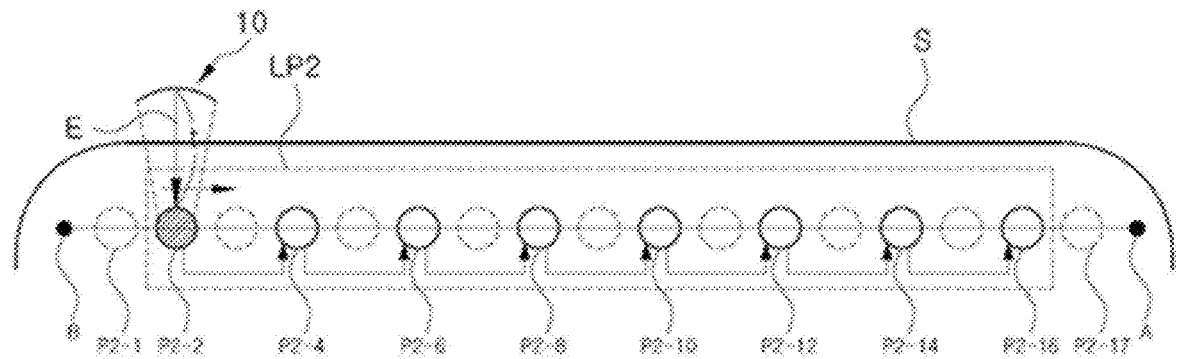

FIG. 6 is a diagram illustrating an example of a movement process of the ultrasonic wave generating unit when a second irradiation mode among irradiation modes of the processor in FIG. 1 is activated.

Referring to FIG. 6, a specific irradiation mode determining step may include determining, through the processor 122, whether a second irradiation mode among the irradiation modes of the ultrasonic wave generating unit 10 is selected and activated (S410).

The ultrasonic wave irradiation location information outputting step may include identifying and outputting, through the processor 122, second ultrasonic wave irradiation location information corresponding to the second irradiation mode when the second irradiation mode among the irradiation modes of the ultrasonic wave generating unit 10 is activated (S420). The second ultrasonic wave irradiation location information may be respective location information for focusing ultrasonic waves of the ultrasonic wave generating unit 10.

The second ultrasonic wave irradiation location information may be information indicating that a plurality of first irradiation points LP1 at a point in time when the ultrasonic wave generating unit 10 moves from first point (A) to second point (B) is different from a plurality of second irradiation points LP2 at a point in time when the ultrasonic wave generating unit 10 moves from second point (B) to first point (A). For example, the plurality of first irradiation points LP1 may be points including all points from P1-1 to P1-17. The plurality of second irradiation point LP2 may be points including P2-2 to P2-16, excluding P2-1 and P2-17.

The second ultrasonic wave irradiation location information may be information for outputting ultrasonic waves to each odd-numbered irradiation locations P1-1, P1-3, . . . , and P1-17 or each even-numbered irradiation locations P2-2, P2-4, . . . , and P2-16 when the ultrasonic wave generating unit 10 moves from first point (A) to second point (B) or from second point (B) to first point (A).

Here, the irradiation location P2-2 may be the same as the irradiation location P1-16; the irradiation location P2-16 may be the same as the irradiation location P1-2; and, the irradiation direction from the irradiation location P2-2 to the irradiation location P2-16 may be the same as the irradiation direction from the irradiation location P1-16 to the irradiation location P1-2.

Moreover, intensity (E) of ultrasonic energy output to each of odd-numbered irradiation locations P1-1, P1-3, . . . , and P1-17 may be the same as or different from intensity (E) of ultrasonic energy output to each of even-numbered irradiation locations P2-2, P2-4, . . . , and P2-16.

Furthermore, time (t) during which irradiation of ultrasonic energy output to each of odd-numbered irradiation locations P1-1, P1-3, . . . , and P1-17 is maintained may be the same as or different from time (t) during which irradiation of ultrasonic energy output to each of even-numbered irradiation locations P2-2, P2-4, . . . , and P2-16. For example, time (t) during which irradiation of ultrasonic energy output to each of odd-numbered irradiation locations P1-1, P1-3, . . . , and P1-17 is maintained is shorter or longer than time (t) during which the irradiation of ultrasonic energy output to each of odd-numbered irradiation locations P1-1, P1-3, . . . , and P1-17 is maintained.

Meanwhile, in the second ultrasonic wave irradiation location information, the plurality of first irradiation point LP1 and the plurality of second irradiation point LP2 may be set to be opposite to the illustration of FIG. 6.

The ultrasonic wave generating unit moving step may include moving, through the processor 122, the ultrasonic wave generating unit 10 to each of odd-numbered irradiation locations P1-1, P1-3, . . . , and P1-17 and each of even-numbered irradiation locations P2-2, P2-4, . . . , and P2-16 corresponding to the second ultrasonic wave irradiation location information through the transfer unit 110 based on the second ultrasonic wave irradiation location information output (S430).

The ultrasonic wave irradiating step may include controlling, through the processor 122, the ultrasonic wave generating unit 10 so as to irradiate ultrasonic waves at intervals to the skin (S) on a movement path through the ultrasonic wave generating unit 10 when the ultrasonic wave generating unit 10 moves to each of odd-numbered irradiation locations P1-1, P1-3, . . . , and P1-17 and each of even-numbered irradiation locations P2-2, P2-4, . . . , and P2-16 through the transfer unit 110 (S440). The ultrasonic wave irradiating step may be a method of irradiating ultrasonic waves in a dot manner while the ultrasonic wave generating unit 10 is stopped, or a method of irradiating ultrasonic waves while continuously moving in a linear manner.

Here, an ultrasonic focusing depth when the ultrasonic wave generating unit 10 moves from first point (A) to second point (B) may be different from an ultrasonic focusing depth when the ultrasonic wave generating unit 10 moves from second point (B) to first point (A). For example, the ultrasonic focusing depth when the ultrasonic wave generating unit 10 moves from first point (A) to second point (B) may be deeper or shallower than the ultrasonic focusing depth when the ultrasonic wave generating unit 10 moves from second point (B) to first point (A).

Moreover, under control of the processor 122, intensity (E) of ultrasonic energy output to each of odd-numbered irradiation locations P1-1, P1-3, . . . , and P1-17 may be the same as or different from intensity (E) of ultrasonic energy output to each of even-numbered irradiation locations P2-2, P2-4, . . . , and P2-16. Also, under control of the processor 122, intensity (E) of ultrasonic energy output to P2-2 may be weakened to prevent burns from occurring at a point close to a return point when the ultrasonic wave generating unit 10 moves from second point (B) to first point (A). Because a temperature after ultrasonic waves are irradiated does not drop a lot at a point close to the return point, intensity (E) of ultrasonic energy output to P2-2 may be weak under control of the processor 122.

Furthermore, under control of the processor 122, time (t) during which irradiation of ultrasonic energy output to each of odd-numbered irradiation locations P1-1, P1-3, . . . , and P1-17 is maintained may be the same as or different from time (t) during which irradiation of ultrasonic energy output to each of even-numbered irradiation locations P2-2, P2-4, . . . , and P2-16. For example, under control of the processor 122, time (t) during which irradiation of ultrasonic energy output to each of odd-numbered irradiation locations P1-1, P1-3, . . . , and P1-17 is maintained is shorter or longer than time (t) during which the irradiation of ultrasonic energy output to each of odd-numbered irradiation locations P1-1, P1-3, . . . , and P1-17 is maintained.

Also, under control of the processor 122, time (t) during which irradiation of ultrasonic energy output to P2-2 is maintained may be short to prevent burns from occurring at a point close to a return point when the ultrasonic wave generating unit 10 moves from second point (B) to first point (A). Because a temperature after ultrasonic waves are irradiated does not drop a lot at a point close to the return point, time (t) during which irradiation of ultrasonic energy output to P2-2 is maintained may be short under control of the processor 122.

Moreover, under control of the processor 122, time (t), during which irradiation of ultrasonic energy output to each of odd-numbered irradiation locations P1-1, P1-3, . . . , and P1-17 is maintained, and intensity (E) of ultrasonic energy output to each of odd-numbered irradiation locations P1-1, P1-3, . . . , and P1-17 may be the same as each other when the ultrasonic wave generating unit 10 moves from first point (A) to second point (B). Afterward, when the ultrasonic wave generating unit 10 moves from second point (B) to first point (A), under control of the processor 122, intensity (E) of ultrasonic energy output to each of even-numbered irradiation locations P2-2, P2-4, . . . , and P2-16 may be gradually high, and time (t), during which irradiation of ultrasonic energy is maintained may be gradually lengthened.

Furthermore, when the ultrasonic wave generating unit 10 moves from first point (A) to second point (B), intensity (E) of ultrasonic energy output to each of odd-numbered irradiation locations P1-1, P1-3, . . . , and P1-17 may be gradually low under control of the processor 122. When the ultrasonic wave generating unit 10 moves from second point (B) to first point (A), intensity (E) of ultrasonic energy output to each of even-numbered irradiation locations P2-2, P2-4, . . . , and P2-16 may be gradually high under control of the processor 122. Accordingly, a temperature may not rise above a reference temperature.

Also, time (t) during which the irradiation of ultrasonic energy output to each of odd-numbered irradiation locations P1-1, P1-3, . . . , and P1-17 or each of even-numbered irradiation locations P2-2, P2-4, . . . , and P2-16 is maintained may be short under control of the processor 122, and thus the temperature is increased again before the temperature decreases. Accordingly, the ultrasonic wave irradiation effect may be improved.

When the second irradiation mode is activated, the movement controlling apparatus 100 of the ultrasonic wave generating unit may maximize the effect of ultrasonic wave irradiation while shortening the ultrasonic wave irradiation time and may prevent the risk of burns.

Figure 7:
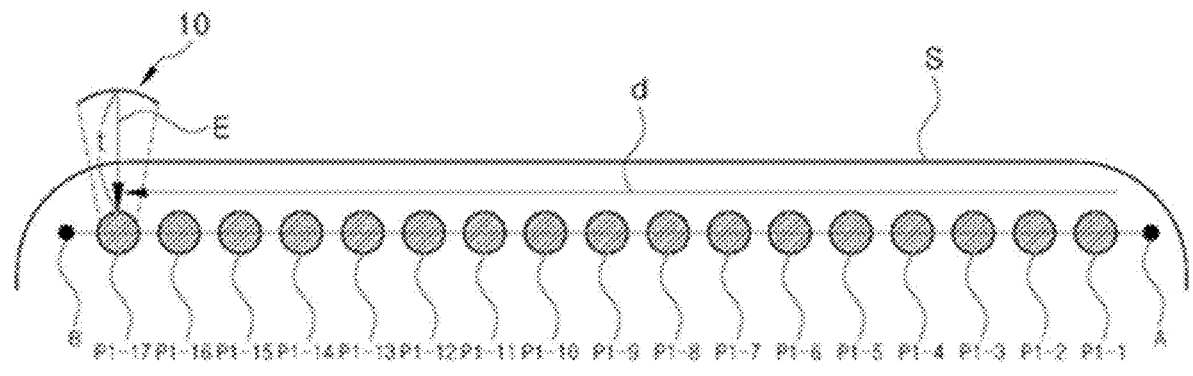
FIG. 7 is a diagram illustrating an example of a movement process of the ultrasonic wave generating unit when a third irradiation mode among irradiation modes of the processor in FIG. 1 is activated.
Figure 7:
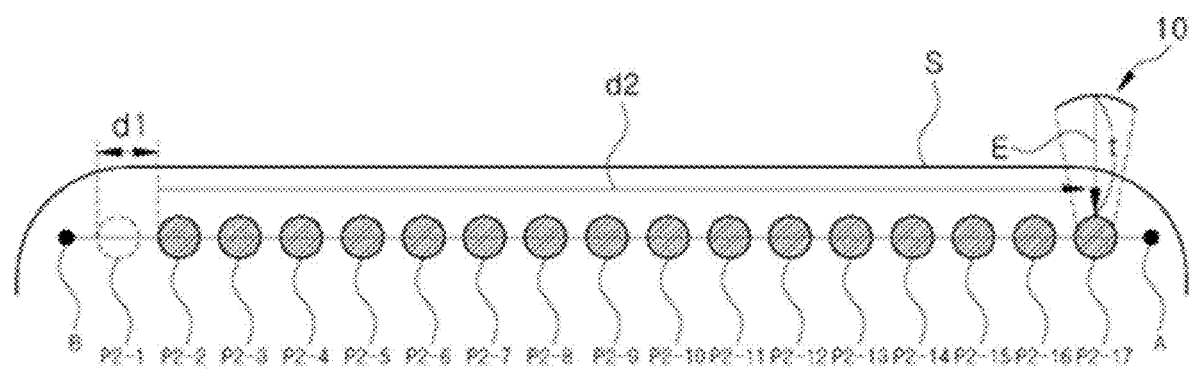
Figure 7:
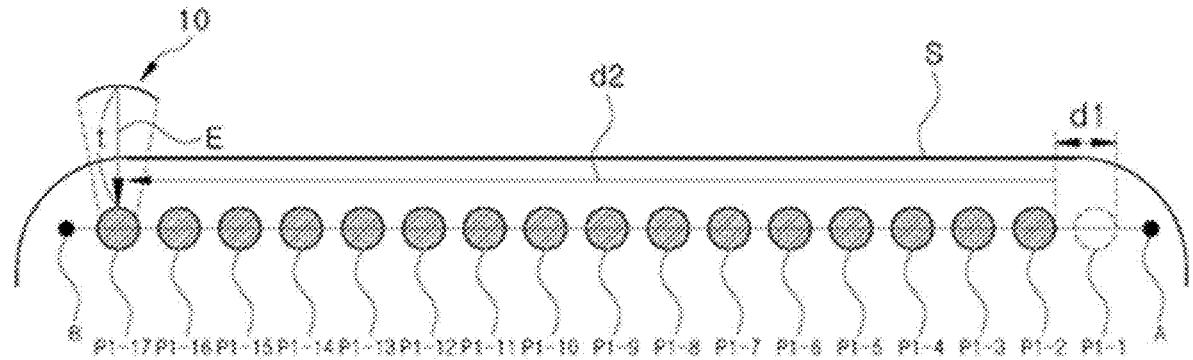

FIG. 7 is a diagram illustrating an example of a movement process of an ultrasonic wave generating unit when a third irradiation mode among irradiation modes of the processor in FIG. 1 is activated.

Referring to FIG. 7, a specific irradiation mode determining step may include determining, through the processor 122, whether a third irradiation mode among the irradiation modes of the ultrasonic wave generating unit 10 is selected and activated (S410).

The ultrasonic wave irradiation location information outputting step may include identifying and outputting, through the processor 122, third ultrasonic wave irradiation location information corresponding to the third irradiation mode when the third irradiation mode among the irradiation modes of the ultrasonic wave generating unit 10 is activated (S420). The third ultrasonic wave irradiation location information may be respective location information for focusing ultrasonic waves of the ultrasonic wave generating unit 10.

The third ultrasonic wave irradiation location information may be information for outputting ultrasonic waves under the same conditions or ultrasonic waves under different conditions at the same irradiation location when the ultrasonic wave generating unit 10 moves back and forth. Here, the condition may include at least one of a time during which irradiation of ultrasonic energy is maintained and the intensity of ultrasonic energy.

The third ultrasonic wave irradiation location information may be information for outputting ultrasonic waves to each of irradiation locations (P1-1 to P1-17) when the ultrasonic wave generating unit 10 moves from first point (A) to second point (B). Here, process (a) may proceed with normal ultrasonic wave irradiation using an ultrasonic wave irradiation distance of 'd'. For example, the normal ultrasonic wave irradiation distance '4:1' may be 25 mm.

Moreover, the third ultrasonic wave irradiation location information may be information for outputting ultrasonic waves to each of irradiation locations P2-2 to P2-17 or P1-2 to P1-17 when the ultrasonic wave generating unit 10 moves from second point (B) to first point (A) or from first point (A) to second point (B). Here, in process (b) and process (c), ultrasound may not be output to the irradiation location (P2-1) (P1-1) to prevent ultrasonic waves from being irradiated at only the current location. In process (b) and process (c), ultrasonic waves may be partially irradiated using an ultrasonic wave irradiation distance of d2, excluding an ultrasonic wave irradiation distance of d1. For example, the excluded ultrasonic wave irradiation distance d1 may be 1 mm to 2.5 mm, and the partial ultrasonic wave irradiation distance d2 of "d–d1" may be 22.5 mm to 24 mm.

Here, the irradiation location P2-16 may be the same as the irradiation location P1-2, and the irradiation direction from the irradiation location P2-2 to the irradiation location P2-16 may be the same as the irradiation direction from the irradiation location P1-16 to the irradiation location P1-2.

Moreover, intensity (E) of ultrasonic energy output to P1-1 to P1-17 may be the same as or different from intensity (E) of ultrasonic energy output to P2-2 to P2-17.

Furthermore, time (t) during which irradiation of ultrasonic energy output to P1-1 to P1-17 is maintained may be the same as or different from time (t) during which irradiation of ultrasonic energy output to P2-2 to P2-17. For example, time (t) during which irradiation of ultrasonic energy output to P1-1 to P1-17 is maintained is shorter or longer than time (t) during which the irradiation of ultrasonic energy output to P2-2 to P2-17 is maintained.

The ultrasonic wave generating unit moving step may include moving, through the processor 122, the ultrasonic wave generating unit 10 to each of the irradiation locations P1-1 to P1-17 and P2-2 to P2-17 corresponding to the third ultrasonic wave irradiation location information through the transfer unit 110 based on the third ultrasonic wave irradiation location information output (S430).

The ultrasonic wave irradiating step may include controlling, through the processor 122, the ultrasonic wave generating unit 10 so as to irradiate ultrasonic waves at intervals to the skin (S) on a movement path through the ultrasonic wave generating unit 10 when the ultrasonic wave generating unit 10 moves to each of the irradiation locations P1-1 to P1-17 and P2-2 to P2-17 through the transfer unit 110 (S440).

Here, an ultrasonic focusing depth when the ultrasonic wave generating unit 10 moves from first point (A) to second point (B) may be different from an ultrasonic focusing depth when the ultrasonic wave generating unit 10 moves from second point (B) to first point (A). For example, the ultrasonic focusing depth when the ultrasonic wave generating unit 10 moves from first point (A) to second point (B) may be deeper or shallower than the ultrasonic focusing depth when the ultrasonic wave generating unit 10 moves from second point (B) to first point (A).

Furthermore, under control of the processor 122, intensity (E) of ultrasonic energy output to P1-1 to P1-17 may be the same as or different from intensity (E) of ultrasonic energy output to P2-2 to P2-17.

Also, under control of the processor 122, intensity (E) of ultrasonic energy output to at least one of P2-1 and P2-2 may be weakened to prevent burns from occurring at a point close to a return point when the ultrasonic wave generating unit 10 moves from second point (B) to first point (A). Because a temperature after ultrasonic waves are irradiated does not drop a lot at a point close to the return point, intensity (E) of ultrasonic energy output to at least one of P2-1 and P2-2 may be weak under control of the processor 122.

Besides, under control of the processor 122, time (t) during which irradiation of ultrasonic energy output to P1-1 to P1-17 is maintained may be the same as or different from time (t) during which irradiation of ultrasonic energy output to P2-2 to P2-17. For example, under control of the processor 122, time (t) during which irradiation of ultrasonic energy output to P1-1 to P1-17 is maintained is shorter than or longer than time (t) during which the irradiation of ultrasonic energy output to P2-2 to P2-17 is maintained.

Also, under control of the processor 122, time (t) during which irradiation of ultrasonic energy output to at least one of P2-1 and P2-2 is maintained may be short to prevent burns from occurring at a point close to a return point when the ultrasonic wave generating unit 10 moves from second point (B) to first point (A). Because a temperature after ultrasonic waves are irradiated does not drop a lot at a point close to the return point, time (t) during which irradiation of ultrasonic energy output to at least one of P2-1 and P2-2 is maintained may be short under control of the processor 122.

Moreover, under control of the processor 122, time (t), during which irradiation of ultrasonic energy output to P1-1 to P1-17 is maintained, and intensity (E) of ultrasonic energy output to P1-1 to P1-17 may be the same as each other when the ultrasonic wave generating unit 10 moves from first point (A) to second point (B). Afterward, when the ultrasonic wave generating unit 10 moves from second point (B) to first point (A), under control of the processor 122, intensity (E) of ultrasonic energy output to P2-1 to P2-17 may be gradually high, and time (t), during which irradiation of ultrasonic energy is maintained may be gradually lengthened.

Furthermore, when the ultrasonic wave generating unit 10 moves from first point (A) to second point (B), intensity (E) of ultrasonic energy output to P1-1 to P1-17 may be gradually low under control of the processor 122. When the ultrasonic wave generating unit 10 moves from second point (B) to first point (A), intensity (E) of ultrasonic energy output to P2-2 to P2-17 may be gradually high under control of the processor 122. Accordingly, a temperature may not rise above a reference temperature.

Also, time (t) during which the irradiation of ultrasonic energy output to P1-1 to P1-17 or P2-2 to P2-17 is maintained may be short under control of the processor 122, and thus the temperature is increased again before the temperature decreases. Accordingly, the ultrasonic wave irradiation effect may be improved.

The movement controlling apparatus 100 of the ultrasonic wave generating unit may prevent a cartridge output from being concentrated at start and end points during reciprocating ultrasonic wave irradiation, when the third irradiation mode is activated, thereby maximizing ultrasonic wave irradiation effects, shortening an ultrasonic wave irradiation time, and preventing the risk of burns.

In the meantime, the irradiation mode of the processor 122 may be set as various other irradiation methods in addition to the above-described irradiation method.

The processor 122 may allow the ultrasonic wave generating unit 10 to continuously irradiate ultrasonic waves when the ultrasonic wave generating unit 10 moves back and forth, and may further allow the ultrasonic wave generating unit 10 to have an idle period in which ultrasonic irradiation is stopped during a predetermined period in a turning section within a reciprocating movement.

Here, the turning section within the reciprocating movement may be a section in which the ultrasonic wave generating unit 10 changes a direction from a forward movement to a return movement or from a return movement to a forward movement.

Furthermore, the predetermined period refers to the entire period or entire distance of the idle period. The idle period refers to a period or distance, in which the irradiation of ultrasonic waves is stopped only during the turning section corresponding to both end points of reciprocating movement to prevent the risk of burns due to repeated irradiation of ultrasonic waves to both end points of the reciprocating movement. For example, the idle period may have a distance having a predetermined ratio (e.g., 10% or less) to the total one-way distance of the reciprocating movement, or may have a time having a predetermined ratio (e.g., 10% or less) to the total time required for one-way movement. Here, an idle period having a predetermined ratio of 10% or less may bring about ultrasonic wave irradiation effects while burns is prevented due to duplicate irradiation. In particular, the idle period, which has a predetermined ratio of 10% may bring about the improvement of ultrasonic wave irradiation effects and the effective prevention of burns due to repeated irradiation while the time zone or distance at which ultrasonic irradiation is stopped is optimized.

Figure 8:
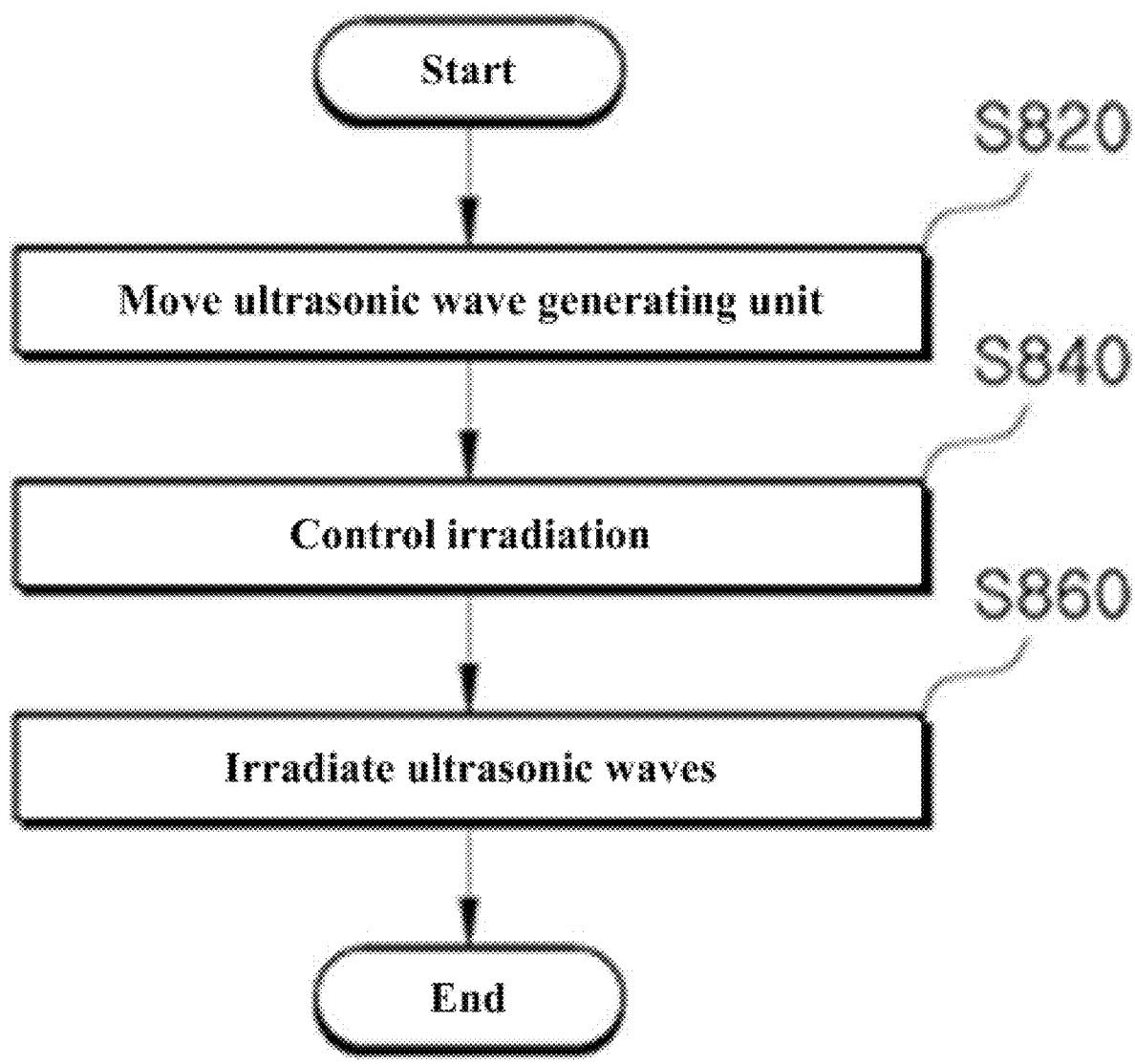
FIG. 8 is a flowchart illustrating another example of a method for controlling movement of an ultrasonic wave generating unit, according to an embodiment of the inventive concept.

FIG. 8 is a flowchart illustrating another example of a method for controlling movement of an ultrasonic wave generating unit, according to an embodiment of the inventive concept.

Referring to FIG. 8, a movement controlling method of an ultrasonic wave generating device may include an ultrasonic wave generating unit moving step S820, an irradiation controlling step S840, and an ultrasonic wave irradiating step S860.

The ultrasonic wave generating unit moving step may include moving the ultrasonic wave generating unit 10 in a predetermined pattern through the transfer unit 110 (S820). The predetermined pattern may include a pattern in which the ultrasonic wave generating unit 10 moves between first point (A) and second point (B).

The irradiation controlling step may include controlling, through the processor 122, the ultrasonic wave generating unit 10 such that the ultrasonic wave generating unit 10 continuously irradiates ultrasonic waves during reciprocating movement (S840). Here, the processor 122 may allow the ultrasonic wave generating unit 10 to have an idle period in which ultrasonic irradiation is stopped during a predetermined period in a turning section within a reciprocating movement.

The ultrasonic wave irradiating step may include irradiating, through the processor 122, ultrasonic waves by determining whether a turning section within the reciprocating movement is correct, when the ultrasonic wave generating unit 10 is moved in a predetermined pattern through the transfer unit 110 (S860). When the turning section within the reciprocating movement is not correct, the ultrasonic wave generating unit 10 may continuously irradiate ultrasonic waves to the skin (S), through the processor 122. When the turning section within the reciprocating movement is correct, the ultrasonic wave generating unit 10 may have an idle period in which ultrasonic irradiation is stopped, through the processor 122.

Figure 9:
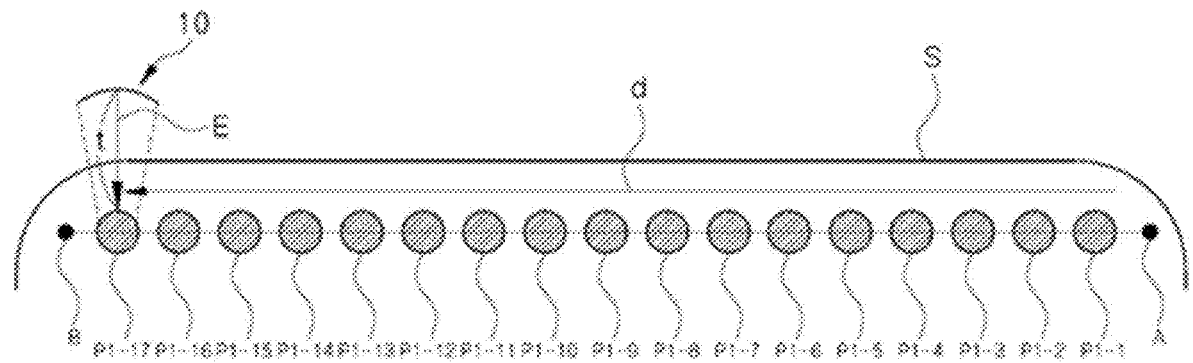
FIG. 9 is a diagram showing an example of a process in which ultrasonic waves are irradiated through the movement controlling method of the ultrasonic wave generating unit of FIG. 8.
Figure 9:
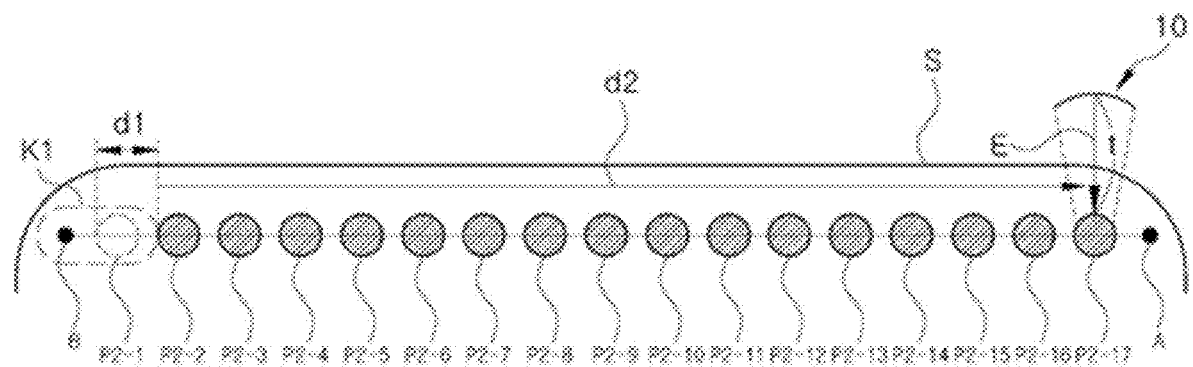
Figure 9:
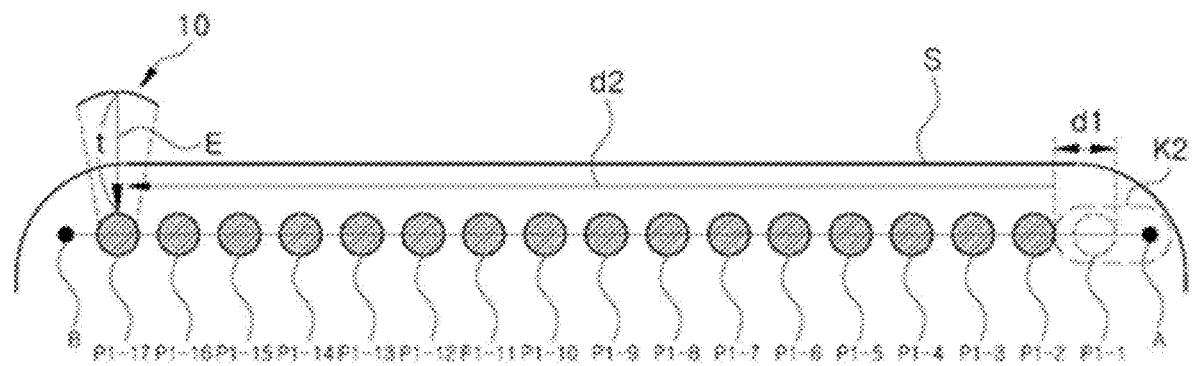

FIG. 9 is a diagram showing an example of a process in which ultrasonic waves are irradiated through a movement controlling method of the ultrasonic wave generating unit of FIG. 8.

Referring to FIG. 9, when the ultrasonic wave generating unit 10 moves from first point (A) to second point (B), the ultrasonic wave generating unit 10 may continuously irradiate ultrasonic waves to each of the irradiation locations P1-1 to P1-17.

Here, process (a) may proceed with normal ultrasonic wave irradiation using an ultrasonic wave irradiation distance of '4:1'. For example, the normal ultrasonic wave irradiation distance '4:1' may be 25 mm.

Afterward, when the ultrasonic wave generating unit 10 moves from second point (B) to first point (A) or moves back from first point (A) to second point (B), the ultrasonic wave generating unit 10 may have an idle period in which ultrasonic irradiation is stopped at a turning section K1 or K2 within the reciprocating movement, and may continuously irradiate ultrasonic waves to each of the irradiation locations P2-2 to P2-17 or P1-2 to P1-17.

Here, in process (b) and process (c), ultrasound may not be output to the irradiation location (P2-1) (P1-1) to prevent skin problems such as burns caused by irradiating ultrasonic waves at only the current location. Process (b) and process (c) may be partially irradiated using an ultrasonic wave irradiation distance of d2, excluding an ultrasonic wave irradiation distance of d1. For example, the excluded ultrasonic wave irradiation distance d1 may be 1 mm to 2.5 mm, and the partial ultrasonic wave irradiation distance d2 of "d–d1" may be 22.5 mm to 24 mm.

In this case, the irradiation location P2-1 may be the same as the irradiation location P1-17, and the irradiation direction from the irradiation location P2-2 to the irradiation location P2-17 may be the same as the irradiation direction from the irradiation location P1-16 to the irradiation direction P1-1.

Figure 10:
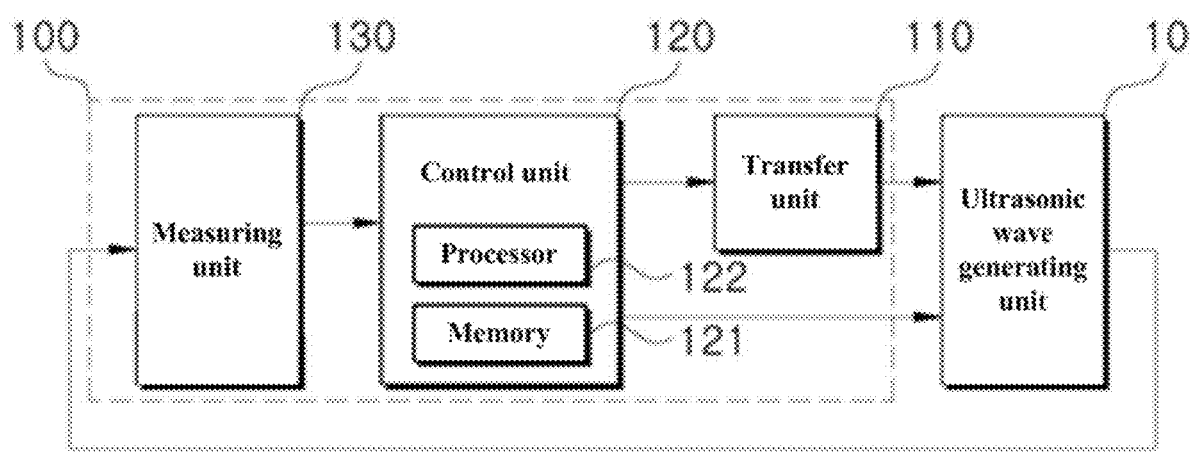
FIG. 10 is a diagram showing another example of a configuration of a movement controlling apparatus of an ultrasonic wave generating unit, according to an embodiment of the inventive concept.

FIG. 10 is a diagram showing another example of a configuration of a movement controlling apparatus of the ultrasonic wave generating unit, according to an embodiment of the inventive concept.

Referring to FIG. 10, the ultrasonic wave generating unit of the movement controlling apparatus 100 may further include a measuring unit 130 that measures an ambient temperature at a turning section within a reciprocating movement. The measuring unit 130 may be provided inside a cartridge housing that accommodates the ultrasonic wave generating unit 10, and may be provided inside a hand piece coupled to the cartridge housing. For example, the measuring unit 130 may be provided as a temperature sensor.

Here, when the ambient temperature is higher than a reference temperature preset in the memory 121, the processor 122 may further allow the ultrasonic wave generating unit 10 to have an idle period in a turning section within the reciprocating movement, in which the ambient temperature is higher than the reference temperature.

Moreover, under control of the processor 122, ultrasonic waves under the same conditions or under different conditions may be output. Here, the condition may include at least one of a time during which irradiation of ultrasonic energy is maintained and the intensity of ultrasonic energy.

Figure 11:
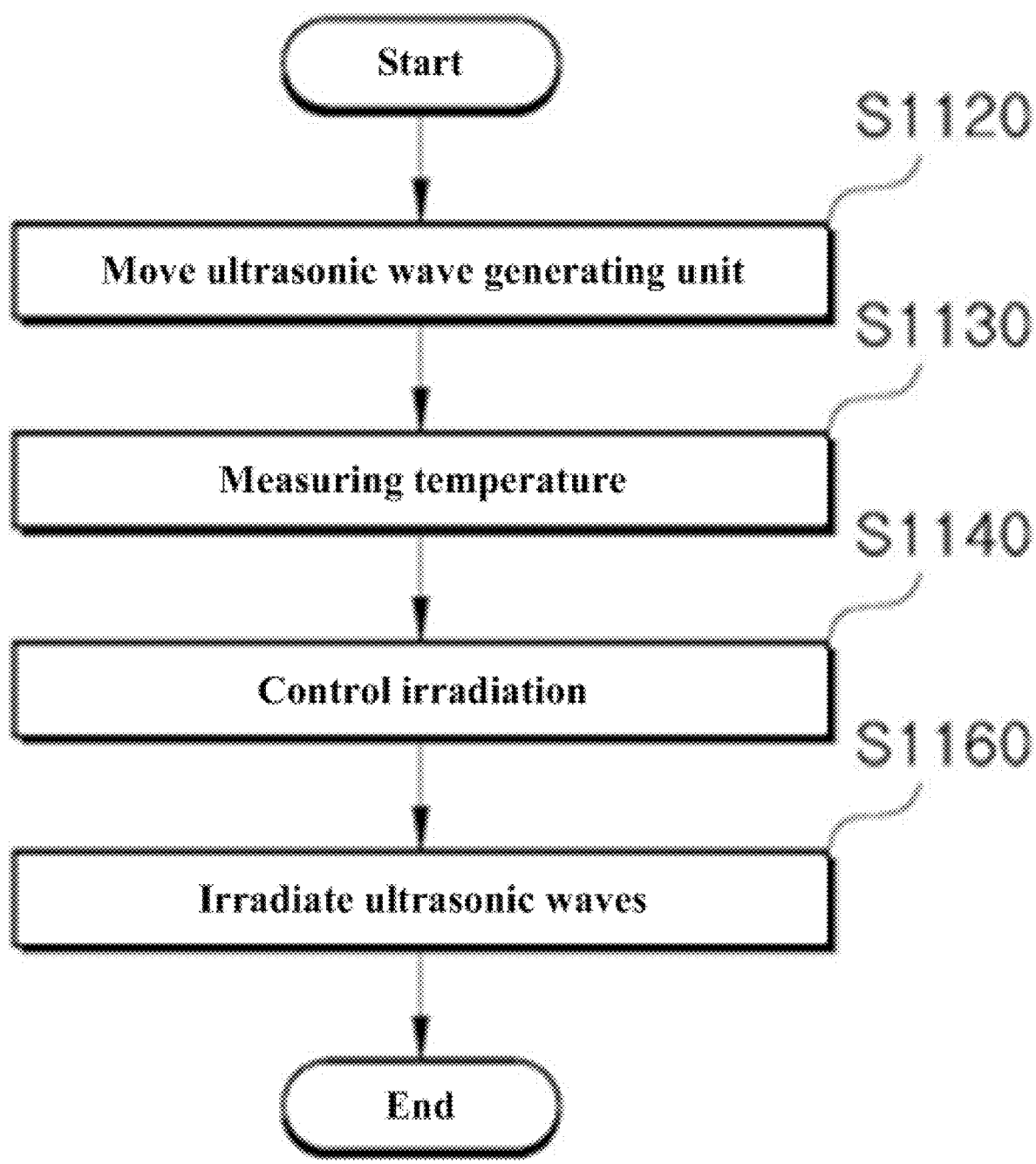
FIG. 11 is a flowchart illustrating still another example of a method for controlling movement of an ultrasonic wave generating unit, according to an embodiment of the inventive concept.

FIG. 11 is a flowchart illustrating still another example of a movement controlling method of the ultrasonic wave generating unit, according to an embodiment of the inventive concept.

Referring to FIG. 11, the movement controlling method of the ultrasonic wave generating unit may further include a measuring step (S1130).

The measuring step may include measuring an ambient temperature at a turning section within a reciprocating movement through the measuring unit 130 (S1130). Here, the ambient temperature may include at least one of an external temperature and a temperature generated by irradiating ultrasonic waves.

In this case, the irradiation controlling step may include controlling, through the processor 122, the ultrasonic wave generating unit 10 such that the ultrasonic wave generating unit 10 continuously irradiates ultrasonic waves during reciprocating movement (S1140). Here, when the ambient temperature is higher than a predetermined reference temperature, the processor 122 may allow the ultrasonic wave generating unit 10 to have an idle period in a turning section within the reciprocating movement, in which the ambient temperature is higher than the reference temperature.

Furthermore, the ultrasonic wave irradiating step may include irradiating, through the processor 122, ultrasonic waves by determining whether the ambient temperature is higher than the predetermined reference temperature, when the ultrasonic wave generating unit 10 is moved in a predetermined pattern (S1160). When the ambient temperature is lower than the predetermined reference temperature, the ultrasonic wave generating unit 10 may continuously irradiate ultrasonic waves to the skin (S), through the processor 122. When the ambient temperature is higher than the predetermined reference temperature, the ultrasonic wave generating unit 10 may have an idle period in which ultrasonic irradiation is stopped, through the processor 122.

Figure 12:
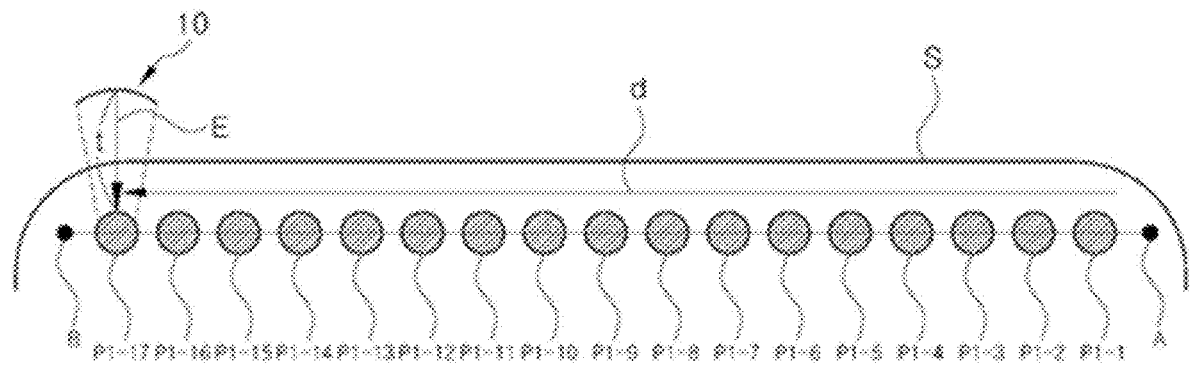
FIG. 12 is a diagram showing an example of a process in which ultrasonic waves are irradiated through a movement controlling method of the ultrasonic wave generating unit of FIG. 11.
Figure 12:
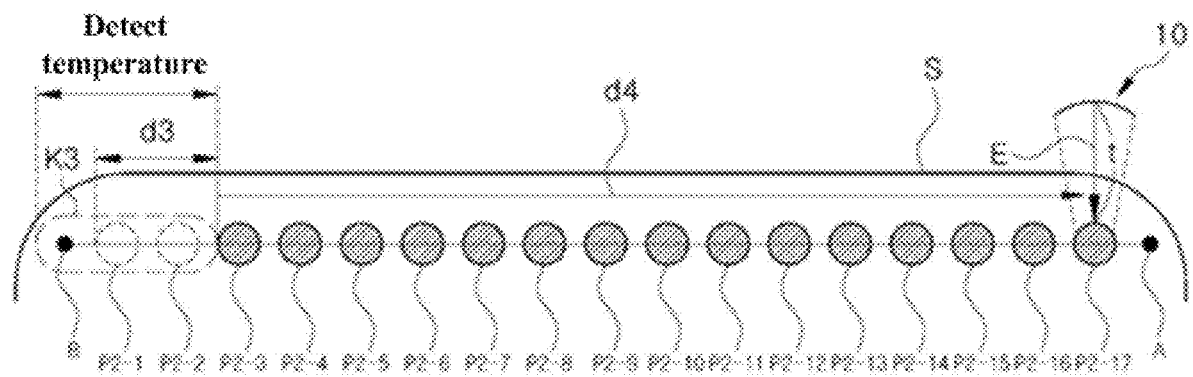
Figure 12:
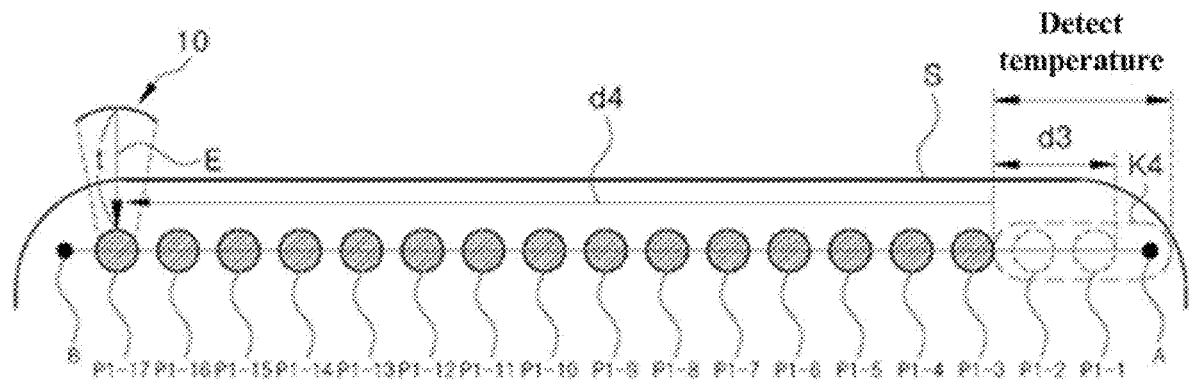

FIG. 12 is a diagram showing an example of a process in which ultrasonic waves are irradiated through the movement controlling method of the ultrasonic wave generating unit of FIG. 11.

Referring to FIG. 12, when the ultrasonic wave generating unit 10 moves from first point (A) to second point (B), the ultrasonic wave generating unit 10 may continuously irradiate ultrasonic waves to each of the irradiation locations P1-1 to P1-17. Here, process (a) may proceed with normal ultrasonic wave irradiation using an ultrasonic wave irradiation distance of 'd'.

Afterward, when the ultrasonic wave generating unit 10 moves from second point (B) to first point (A) or moves again from first point (A) to second point (B), the measuring unit 130 may measure an ambient temperature immediately before the ultrasonic wave generating unit 10 moves from second point (B) to first point (A), or an ambient temperature immediately before the ultrasonic wave generating unit 10 moves back from first point (A) to second point (B).

When the ambient temperature is higher than a predetermined first reference temperature, the processor 122 may allow the ultrasonic wave generating unit 10 to have an idle period in a turning section K3 within the reciprocating movement, in which the ambient temperature is higher than the first reference temperature. When the ambient temperature is higher than a predetermined second reference temperature, the processor 122 may allow the ultrasonic wave generating unit 10 to have an idle period in a turning section K4 within the reciprocating movement, in which the ambient temperature is higher than the second reference temperature.

In the turning section K3 within the reciprocating movement, in which the ambient temperature is higher than the first reference temperature, or the turning section K4 within the reciprocating movement, in which the ambient temperature is higher than the second reference temperature, the ultrasonic wave generating unit 10 may have an idle period in which ultrasonic irradiation is stopped, and may continuously irradiate ultrasonic waves to each of the irradiation locations P2-3 to P2-17 or P1-3 to P1-17.

Here, in process (b) and process (c), ultrasound may not be output at the irradiation locations P2-1 and P2-2 or P1-1 and P1-2 in consideration of a high temperature. In process (b) and process (c), ultrasonic waves may be partially irradiated using an ultrasonic wave irradiation distance of d4, excluding an ultrasonic wave irradiation distance of d3.

In this case, the irradiation location P2-3 may be the same as irradiation location P1-15, and an irradiation location in a direction (P2-3→P2-17) may be the same as an irradiation location in a direction (P1-15→P1-1).

In the meantime, under control of the processor 122, ultrasonic waves under the same conditions or under different conditions may be output. In this case, the condition may include at least one of a time during which irradiation of ultrasonic energy is maintained and the intensity of ultrasonic energy.

Furthermore, under control of the processor 122, intensity (E) of ultrasonic energy output to P1-1 to P1-17 may be the same as or different from intensity (E) of ultrasonic energy output to P2-2 to P2-17.

Besides, under control of the processor 122, time (t) during which irradiation of ultrasonic energy output to P1-1 to P1-17 is maintained may be the same as or different from time (t) during which irradiation of ultrasonic energy output to P2-2 to P2-17. For example, under control of the processor 122, time (t) during which irradiation of ultrasonic energy output to P1-1 to P1-17 is maintained is shorter than or longer than time (t) during which the irradiation of ultrasonic energy output to P2-2 to P2-17 is maintained.

Moreover, under control of the processor 122, time (t), during which irradiation of ultrasonic energy output to P1-1 to P1-17 or P1-2 to P1-17 is maintained, and intensity (E) of ultrasonic energy output to P1-1 to P1-17 or P1-2 to P1-17 may be the same as each other when the ultrasonic wave generating unit 10 moves from first point (A) to second point (B) or moves again. Afterward, when the ultrasonic wave generating unit 10 moves from second point (B) to first point (A), under control of the processor 122, intensity (E) of ultrasonic energy output to P2-2 to P2-17 may be gradually high, and time (t), during which irradiation of ultrasonic energy is maintained may be gradually long.

Furthermore, when the ultrasonic wave generating unit 10 moves from first point (A) to second point (B) or moves again, intensity (E) of ultrasonic energy output to P1-1 to P1-17 or P1-2 to P1-17 may be gradually low under control of the processor 122. When the ultrasonic wave generating unit 10 moves from second point (B) to first point (A) to, intensity (E) of ultrasonic energy output to P2-2 to P2-17 may be gradually high under control of the processor 122. Accordingly, a temperature may not rise above a reference temperature.

Also, time (t) during which the irradiation of ultrasonic energy output to P1-1 to P1-17 or P2-2 to P2-17 is maintained may be short under control of the processor 122, and thus the temperature is increased again before the temperature decreases. Accordingly, the ultrasonic wave irradiation effect may be improved.

As such, the movement controlling apparatus 100 of the ultrasonic wave generating unit may prevent a cartridge output from being concentrated in the turning section K1, K2, K3, or K4 within the reciprocating movement during the irradiation of reciprocating ultrasonic wave, thereby maximizing ultrasonic wave irradiation effects, shortening an ultrasonic wave irradiation time, and preventing the risk of burns.

The ultrasonic wave generating device according to an embodiment of the inventive concept may irradiate ultrasonic surface waves to a deep part of skin and may irradiate ultrasonic waves to a relatively large area in the deep part of skin at once.

Hereinafter, the ultrasonic wave generating device capable of adjusting an ultrasonic focusing depth will be described in detail.

Figure 13:
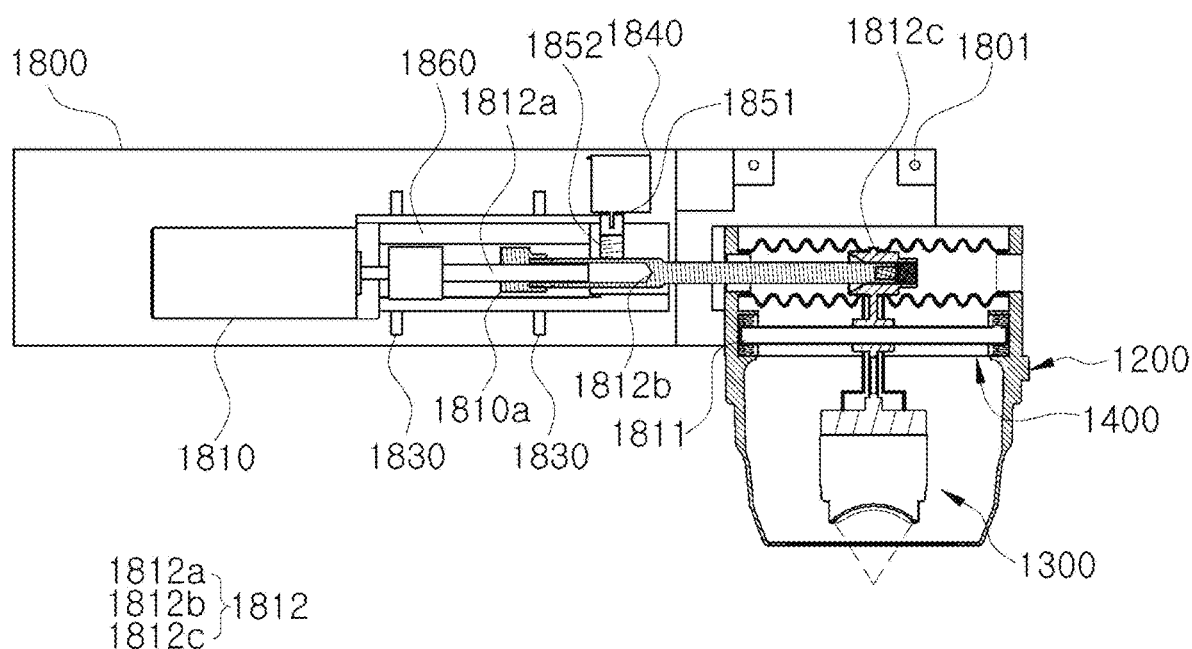
FIG. 13 is a diagram showing an example of a configuration of an ultrasonic wave generating device capable of adjusting an ultrasonic focusing depth, according to an embodiment of the inventive concept.
Figure 14:
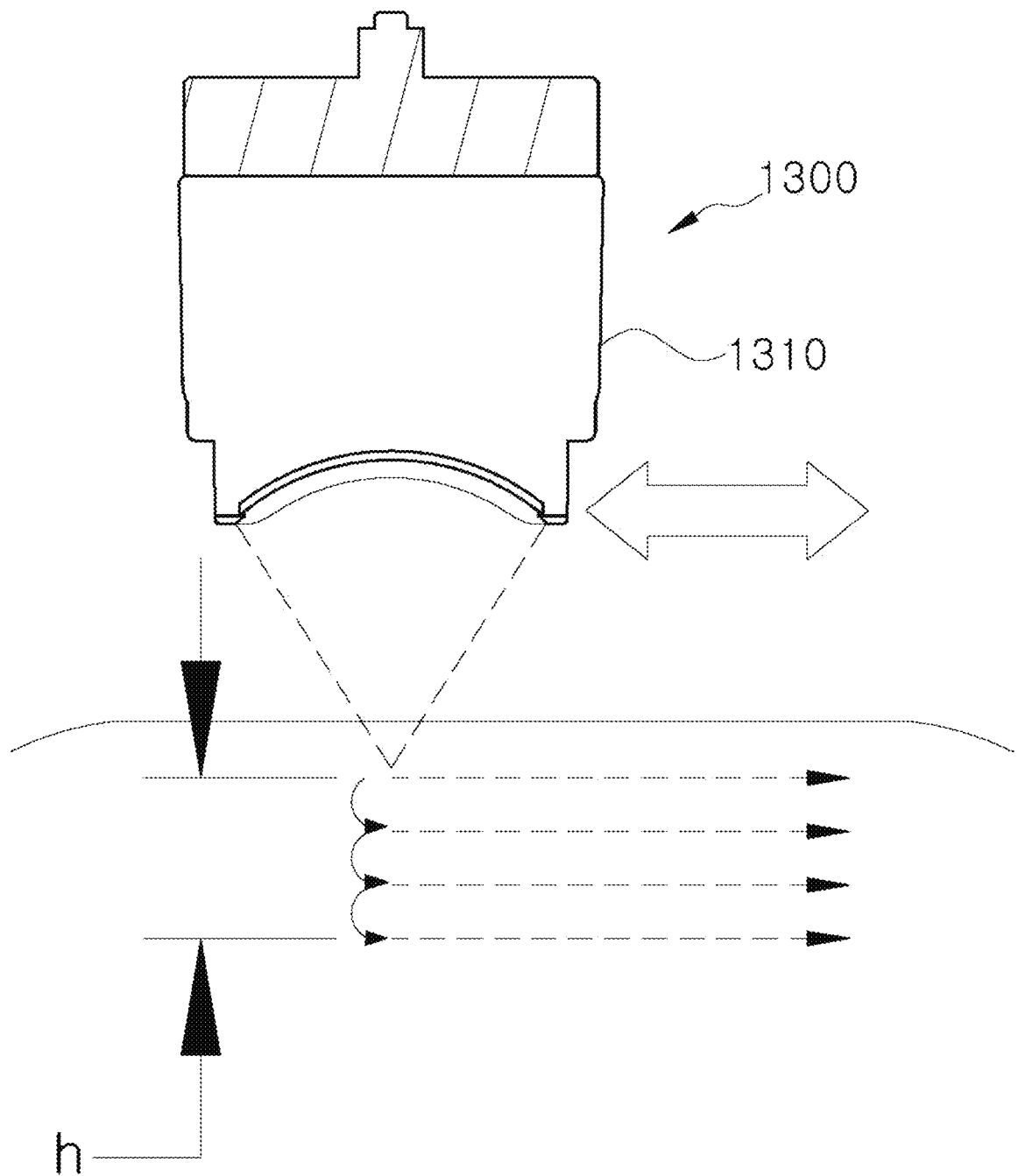
FIGS. 14 and 15 are diagrams showing an example of a process of irradiating ultrasonic waves in horizontal and vertical directions using the ultrasonic wave generating device capable of adjusting the ultrasonic focusing depth of FIG. 13.
Figure 15:
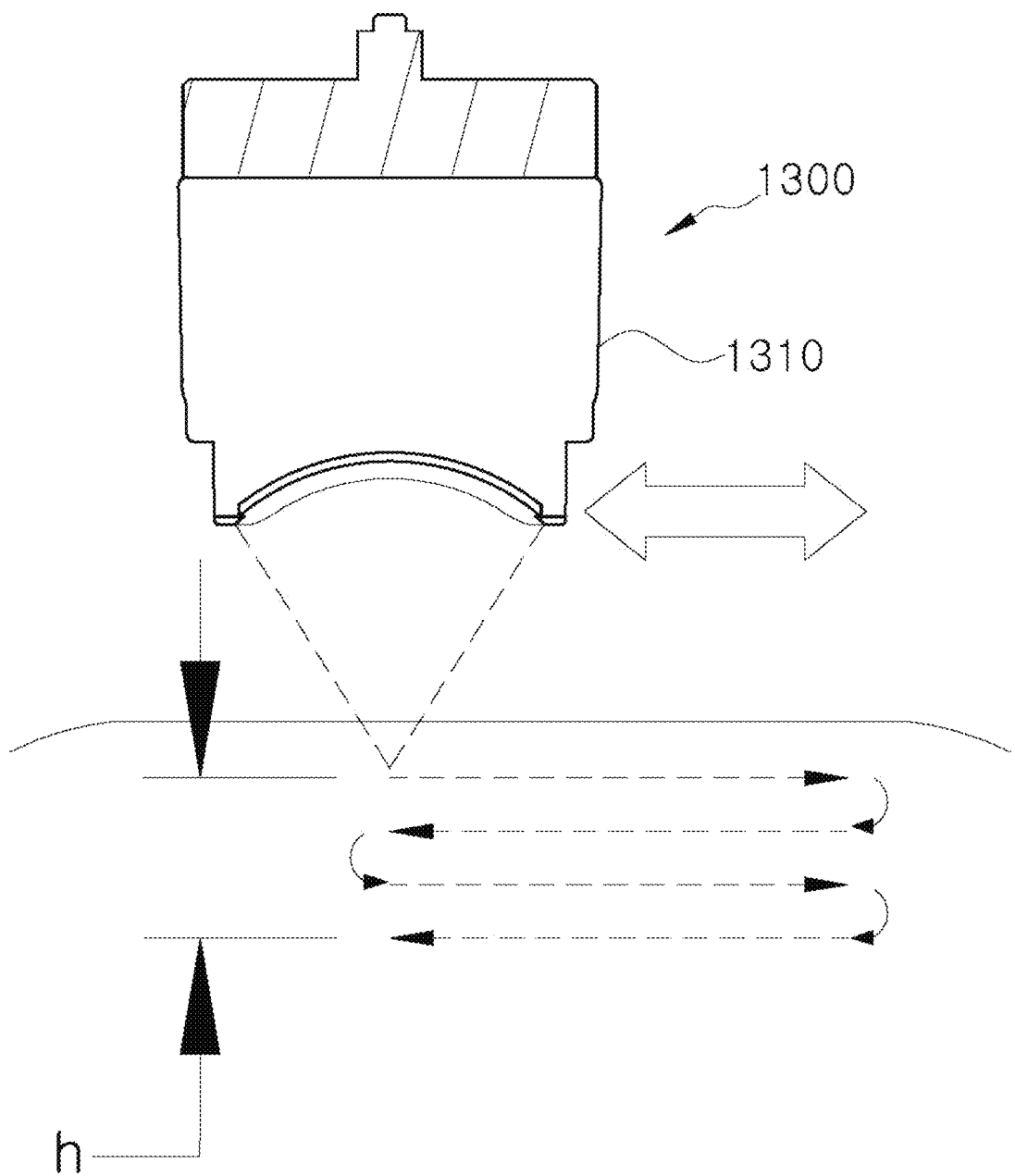

FIG. 13 is a diagram showing an example of a configuration of an ultrasonic wave generating device capable of adjusting an ultrasonic focusing depth, according to an embodiment of the inventive concept. FIGS. 14 and 15 are diagrams showing an example of a process of irradiating ultrasonic waves in horizontal and vertical directions by using an ultrasonic wave generating device capable of adjusting the ultrasonic focusing depth of FIG. 13.

Referring to FIG. 13, an ultrasonic wave generating device capable of adjusting an ultrasonic focusing depth may further include a guide 1830 and a second driving device 1840 to automatically move an ultrasonic wave generating unit 1300 in a vertical direction.

The guide 1830 may be provided between a hand piece 1800 and a movable plate 1860 in a vertical direction, and may be coupled to the hand piece 1800. Additionally, the movable plate 1860 may be coupled to be movable along the guide 1830, or the movable plate 1860 itself may be moved in the vertical direction. The second driving device 1840 may move the movable plate 1860 in the vertical direction. As such, a first driving device 1810, an auxiliary shaft 1811, a main shaft 1812, a length adjustment rod 1812b, the ultrasonic wave generating unit 1300, and a guide member 1400 are also moved in the vertical direction in conjunction with the vertical movement of the movable plate 1860, and thus an ultrasonic focusing depth (h) of the ultrasonic wave generating unit 1300 may be adjusted. In this case, the movable plate 1860 may be moved linearly along the guide 1830, or the movable plate 1860 itself may be moved vertically.

For example, the second driving device 1840 may be a driving motor that moves the movable plate 1860 in the vertical direction. Here, a screw shaft 1851 may be coupled to a driving shaft of a driving motor of the second driving device 1840. The movable plate 1860 may be provided with a screw nut 1852 that is screwed to the screw shaft 1851.

Accordingly, when the screw shaft 1851 is rotated by the second driving device 1840, the screw nut 1852 and the movable plate 1860 may be moved vertically along the screw shaft 1851. As such, the first driving device 1810, the auxiliary shaft 1811, the main shaft 1812, the length adjustment rod 1812b, the ultrasonic wave generating unit 1300, and the guide member 1400 are also moved in the vertical direction in conjunction with the vertical movement of the screw nut 1852 and the movable plate 1860, and thus an ultrasonic focusing depth of the ultrasonic wave generating unit 1300 may be adjusted. In this case, the movable plate 1860 may be moved linearly along the guide 1830, or the movable plate 1860 itself may be moved vertically.

As described above, when the screw shaft 1812*a* is rotated by the rotation of the driving motor of the first driving device 1810, a screw nut 1810*a* may be moved horizontally along the screw shaft 1812*a*.

The length adjustment rod 1812*b*, an insertion protrusion 1812*c*, the ultrasonic wave generating unit 1300, and the guide member 1400 may also be moved in a horizontal direction, in conjunction with a horizontal movement of the screw nut 1810*a*, and thus the ultrasonic focus of the ultrasonic wave generating unit 1300 may be moved in the horizontal direction. At this time, the second driving device 1840 may be fixed to the hand piece 1800.

Accordingly, the ultrasonic wave generating device according to an embodiment of the inventive concept may move the ultrasonic wave generating unit 1300 in the horizontal direction by using the first driving device 1810. In this case, the ultrasonic focus of the ultrasonic wave generating unit 1300 in a deep part of skin may be moved in the horizontal direction.

Besides, the ultrasonic wave generating device according to an embodiment of the inventive concept may move the ultrasonic wave generating unit 1300 in the vertical direction by using the second driving device 1840. In this case, the ultrasonic focus of the ultrasonic wave generating unit 1300 in a deep part of skin may be moved in the vertical direction. This may mean that the ultrasonic focusing depth of the ultrasonic wave generating unit 1300 is changed.

Meanwhile, the ultrasonic wave generating device according to an embodiment of the inventive concept may automatically adjust a location of the ultrasonic wave generating unit 1300 based on a user interface having a display (not shown) that displays the horizontal movement distance and vertical movement distance of the ultrasonic focus of the ultrasonic wave generating unit 1300 in a deep part of skin.

The display may be provided in an ultrasonic wave generating device body (not shown), the hand piece 1800 or 1801, or a cartridge housing 1200. A screen of the display may display a user interface for entering target values for the horizontal movement distance and vertical movement distance of the ultrasonic focus of the ultrasonic wave generating unit 1300 in the deep part of skin.

For example, the display may be implemented as a touchpad, and the user interface may be implemented as a keypad for entering target values for the horizontal movement distance and vertical movement distance of the ultrasonic wave generating unit 1300 in the deep part of skin.

For another example, the display may be implemented as a touchpad, and the user interface may be implemented as a plurality of icons, which respectively displays target values for the horizontal movement distance and vertical movement distance of the ultrasonic wave generating unit 1300 in the deep part of skin.

Meanwhile, the ultrasonic wave generating device according to an embodiment of the inventive concept may automatically adjust the vertical location and horizontal location of the ultrasonic wave generating unit 1300 based on a switch located on the hand piece.

Hereinafter, a process of irradiating ultrasonic waves in the horizontal and vertical directions by using the ultrasonic wave generating device capable of adjusting an ultrasonic focusing depth according to an embodiment of the inventive concept will be described.

Most of all, the horizontal movement distance and vertical movement distance of the ultrasonic focus of the ultrasonic wave generating unit 1300 in the deep part of skin may be entered by a user into the user interface.

Next, the first driving device 1810 and the second driving device 1840 may be operated alternately or irregularly depending on the horizontal movement distance and vertical movement distance of the ultrasonic focus of the ultrasonic wave generating unit 1300 in the deep part of skin, which are entered into the user interface. In this way, the horizontal movement and vertical movement of the ultrasonic wave generating unit 1300 may be alternately performed by the alternate operation of the first driving device 1810 and the second driving device 1840.

Referring to FIG. 14, a process in which the first driving device 1810 moves the ultrasonic wave generating unit 1300 in a forward direction (i.e., a right side) of the horizontal direction, a process in which the second driving device 1840 moves the ultrasonic wave generating unit 1300 in the vertical direction, a process in which the first driving device 1810 moves the ultrasonic wave generating unit 1300 in a direction (i.e., a left side) opposite to the horizontal direction, and a process in which the second driving device 1840 moves the ultrasonic wave generating unit 1300 in a direction opposite to the vertical direction may be repeated as one cycle.

Moreover, referring to FIG. 15, a process in which the first driving device 1810 moves the ultrasonic wave generating unit 1300 in a forward direction (i.e., a right side) of the horizontal direction, a process in which the second driving device 1840 moves the ultrasonic wave generating unit 1300 in the vertical direction, a process in which the first driving device 1810 moves the ultrasonic wave generating unit 1300 in a direction (i.e., a left side) opposite to the horizontal direction, and a process in which the second driving device 1840 moves the ultrasonic wave generating unit 1300 in a direction opposite to the vertical direction may be repeated as one cycle.

In this case, the ultrasonic focus of the ultrasonic wave generating unit 1300 in the deep part of skin moves in a horizontal direction depending on the horizontal movement of the ultrasonic wave generating unit 1300, and the ultrasonic focus of the ultrasonic wave generating unit 1300 in the deep part of skin is moved in the vertical direction.

Accordingly, in a process of irradiating ultrasonic waves in the horizontal and vertical directions by using an ultrasonic wave generating device capable of adjusting an ultrasonic focusing depth according to an embodiment of the inventive concept, the ultrasonic focus of the ultrasonic wave generating unit in the deep part of skin may be automatically moved horizontally and vertically by the first driving device and the second driving device. Accordingly, the ultrasonic wave generating device according to an embodiment of the inventive concept may irradiate ultrasonic surface waves to the deep part of skin and may irradiate ultrasonic waves to a relatively large area in the deep part of skin at once.

The ultrasonic wave generating device according to an embodiment of the inventive concept may prevent burns caused by focusing ultrasonic waves output from a transducer on a specific area of a skin.

Hereinafter, an ultrasonic wave generating device to prevent burns will be described in detail.

Figure 16:
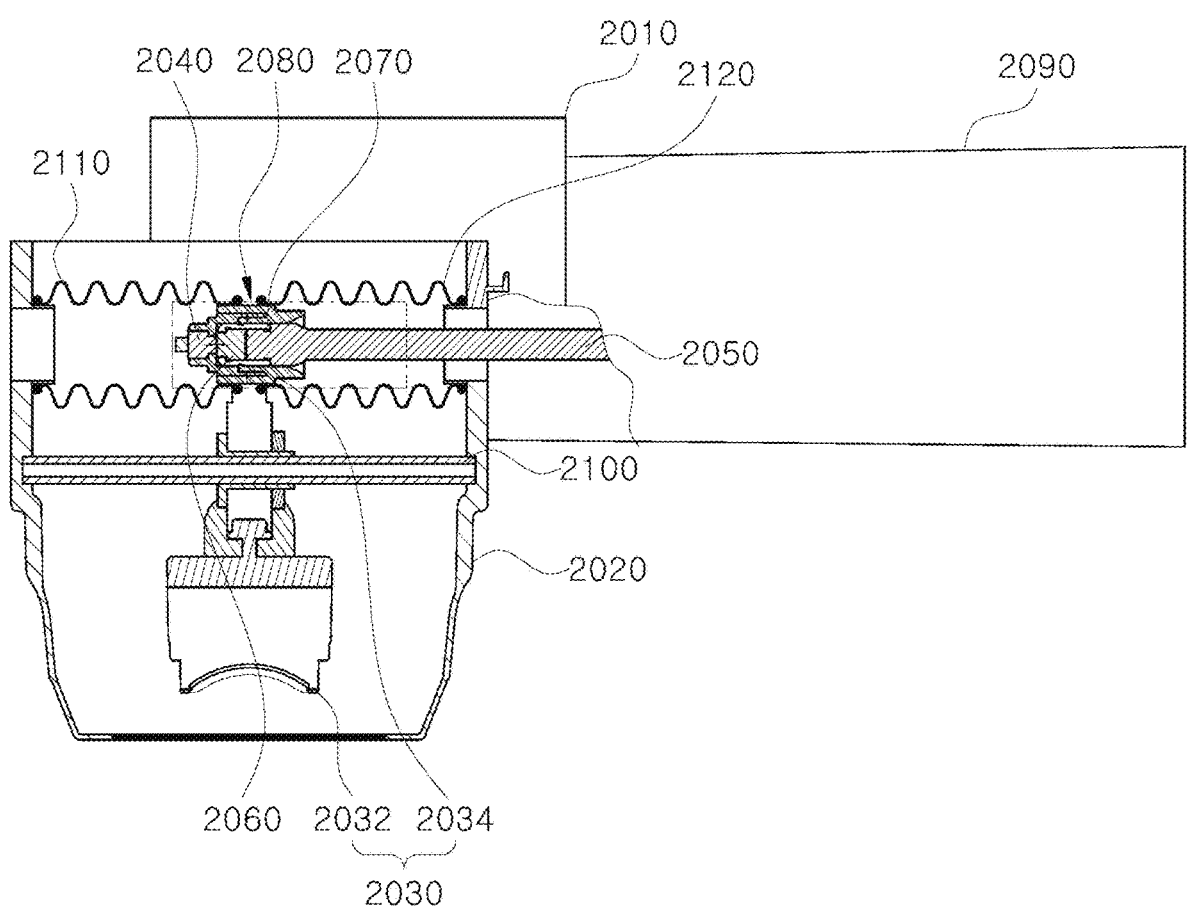
FIG. 16 is a diagram illustrating an example of a configuration of an ultrasonic wave generating device, according to an embodiment of the inventive concept.
Figure 17:
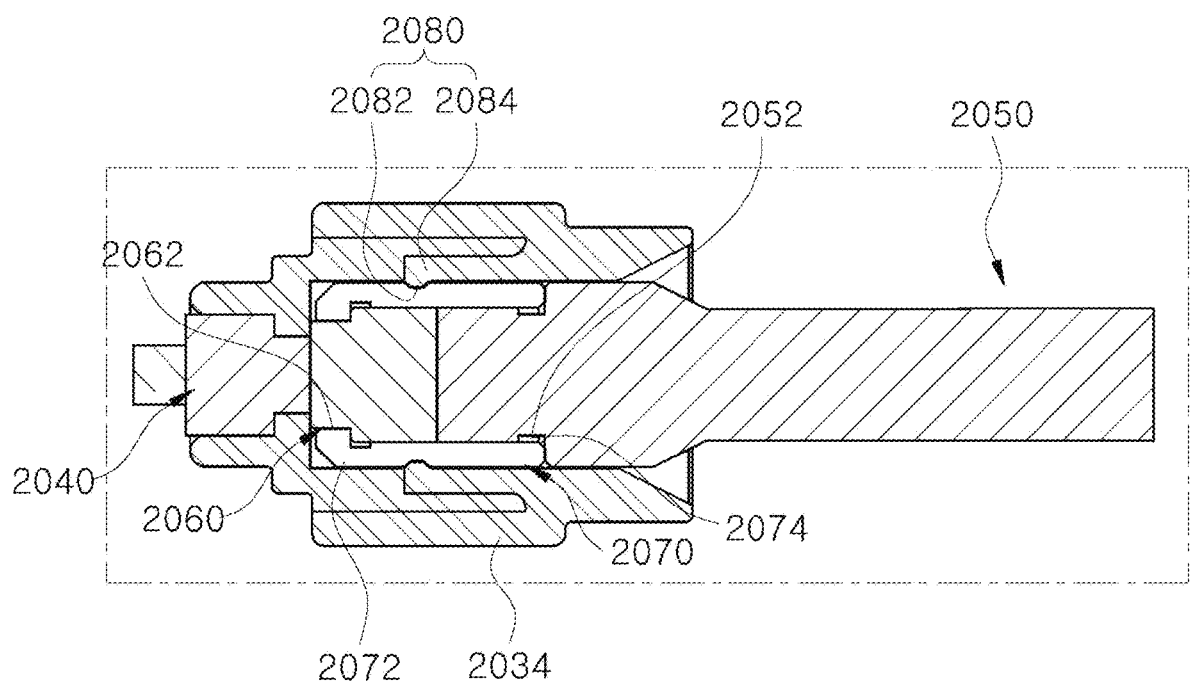
FIG. 17 is a cross-sectional view illustrating a mounter, a moving shaft, a first magnetic member, a second magnetic member, an adapter, and a coupling unit of an ultrasonic wave generating device, according to an embodiment of the inventive concept.

FIG. 16 is a diagram illustrating an example of a configuration of the ultrasonic wave generating device, according to an embodiment of the inventive concept. FIG. 17 is a cross-sectional view illustrating a mounter, a moving shaft, a first magnetic member, a second magnetic member, an adapter, and a coupling unit of the ultrasonic wave generating device, according to an embodiment of the inventive concept.

Figure 18:
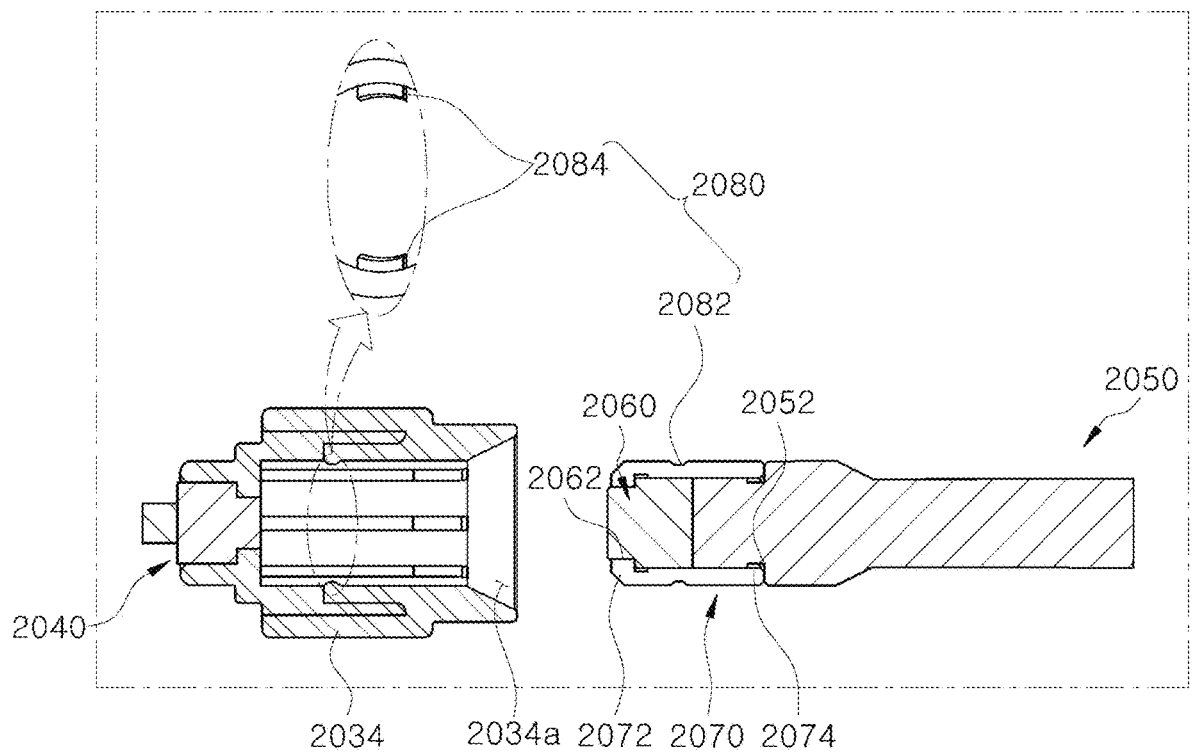
FIG. 18 is an exploded cross-sectional view of a mounter and a moving shaft of an ultrasonic wave generating device, according to an embodiment of the inventive concept.
Figure 19:
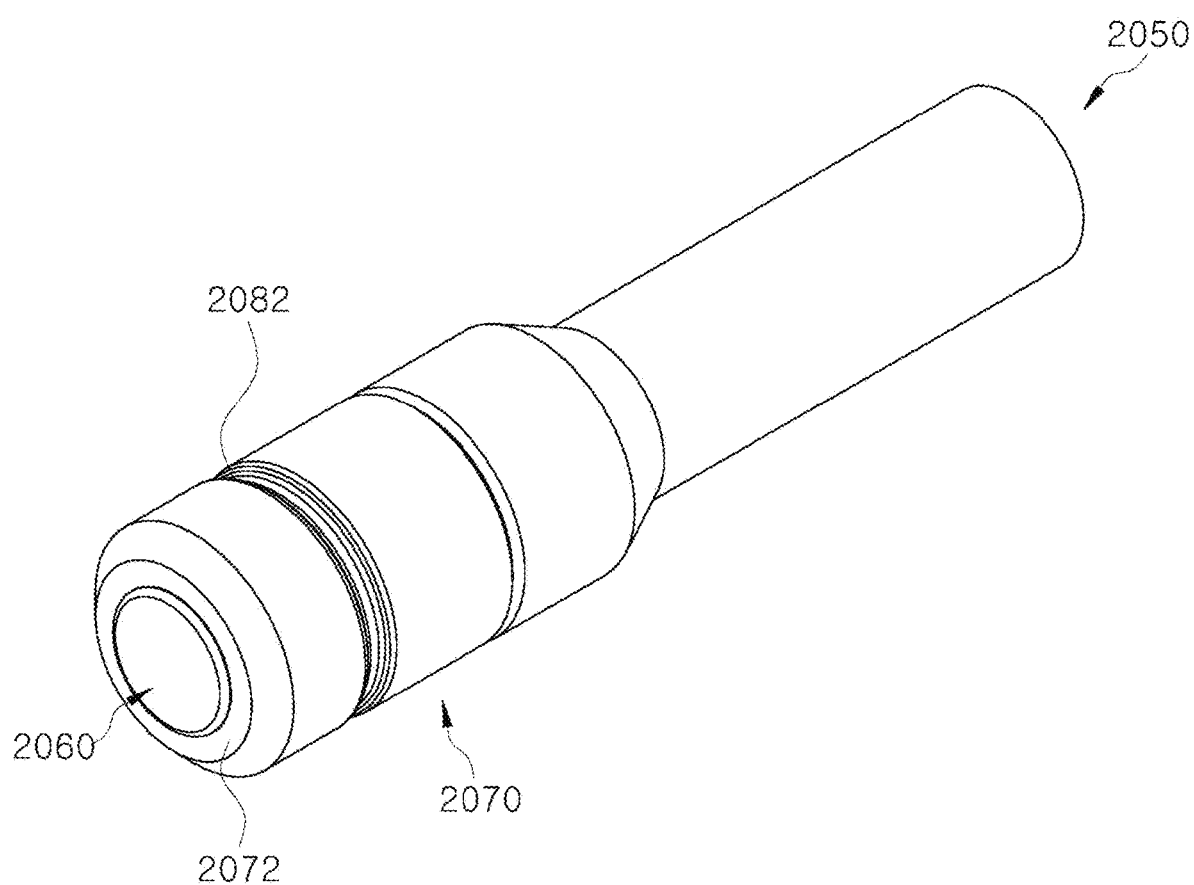
FIG. 19 is a perspective view illustrating a second magnetic member, an adapter, and a moving shaft of an ultrasonic wave generating device, according to an embodiment of the inventive concept.
Figure 20:
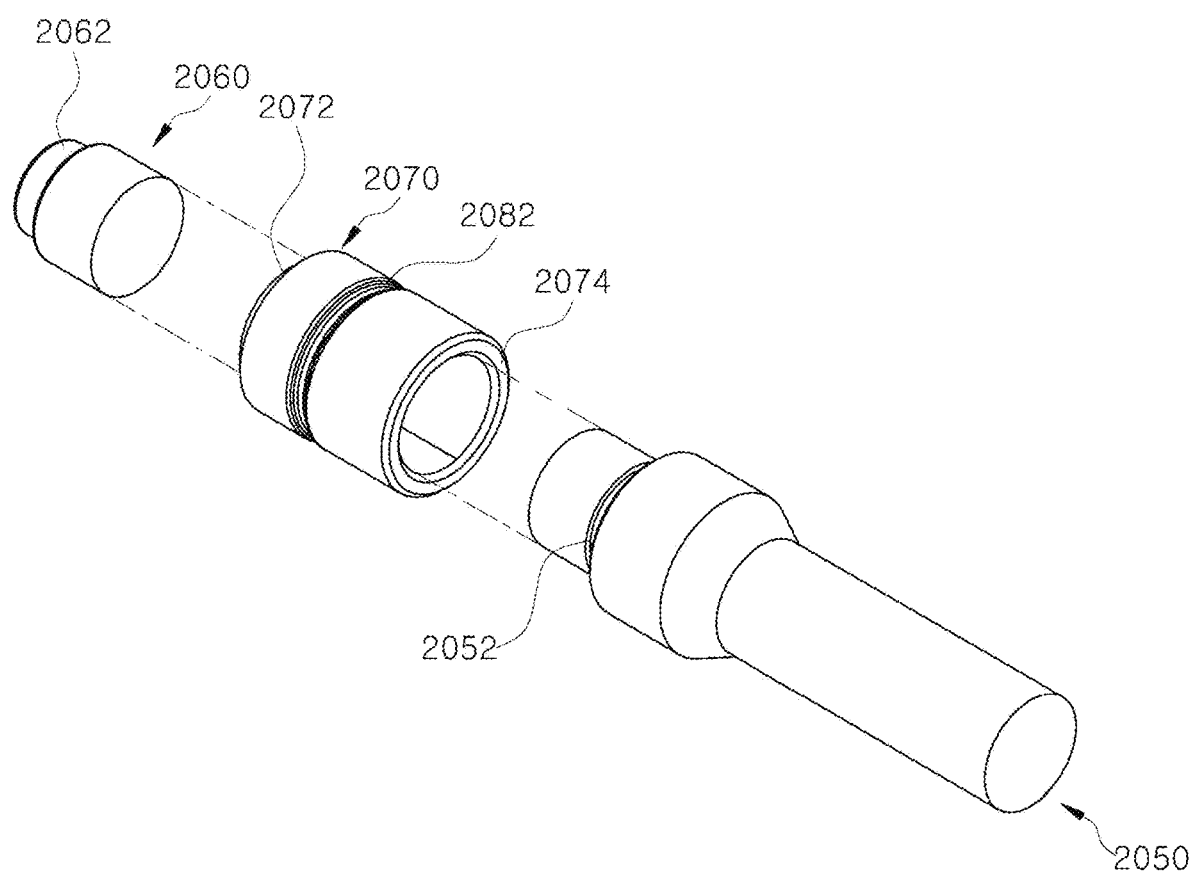
FIG. 20 is an exploded perspective view illustrating a second magnetic member, an adapter, and a moving shaft of an ultrasonic wave generating device, according to an embodiment of the inventive concept.

FIG. 18 is an exploded cross-sectional view of a mounter and a moving shaft of an ultrasonic wave generating device, according to an embodiment of the inventive concept. FIG. 19 is a perspective view illustrating a second magnetic member, an adapter, and a moving shaft of an ultrasonic wave generating device, according to an embodiment of the inventive concept. FIG. 20 is an exploded perspective view illustrating a second magnetic member, an adapter, and a moving shaft of an ultrasonic wave generating device, according to an embodiment of the inventive concept.

Referring to FIGS. 16 to 20, the ultrasonic wave generating device may include a hand piece 2010, a cartridge housing 2020, an ultrasonic wave generation module 2030, a moving shaft 2050, a first magnetic member 2040, a second magnetic member 2060, an adapter 2070, and a coupling unit 2080.

The hand piece 2010 may be a basic body, and may be used as a handle for the user's grip. The cartridge housing 2020 may be detachably attached to one side of the hand piece 2010. Here, the ultrasonic wave generation module 2030 having a transducer 2032 that generates ultrasonic waves may be provided inside the cartridge housing 2020. Accordingly, in a state where the cartridge housing 2020 is placed adjacent to a user's skin while the user holds the hand piece 2010, ultrasonic waves generated by the ultrasonic wave generation module 2030 may be irradiated to a target area of the skin while the hand piece 2010 is being moved.

A cable connected to an RF board for applying an RF current to the transducer 2032 may be provided inside the hand piece 2010. The RF board may be accommodated in a main body or the hand piece 2010, and may intermittently or continuously apply the RF current to the transducer 2032.

The cartridge housing 2020 may be a type of case that accommodates the transducer 2032 and may be detachably coupled to the hand piece 2010. The cartridge housing 2020 may accommodate a fluid medium for delivering ultrasonic waves generated by the transducer 2032. Here, the fluid medium may be distilled water, degassed liquid, or silicon, but is not particularly limited thereto.

The ultrasonic wave generation module 2030 may be provided in the cartridge housing 2020 and may generate ultrasonic waves. The ultrasonic wave generation module 2030 may include a mounter 2034 and the transducer 2032.

The mounter 2034 may be detachably connected to the moving shaft 2050, and the transducer 2032 may be mounted on the mounter 2034. Here, the moving shaft 2050 may be detachably connected to the mounter 2034 and may move the ultrasonic wave generation module 2030 having the mounter 2034 and the transducer 2032.

The mounter 2034 may be equipped with the first magnetic member 2040 that generates magnetic force. An insertion recess 2034a in which the first magnetic member 2040 is stored may be formed in the mounter 2034. Here, a front end part of the moving shaft 2050 may be inserted into the insertion recess 2034a. After the front end part of the moving shaft 2050 is inserted into the insertion recess, the mounter 2034 and the moving shaft 2050 may be connected to each other as the second magnetic member 2060, which is provided in the front end part of the moving shaft 2050, is coupled to the first magnetic member 2040 accommodated in the insertion recess 2034a by magnetic force.

The mounter 2034 may be moved in an axial direction of the moving shaft 2050 by the moving shaft 2050. In this case, the axial direction of the moving shaft 2050 may be an X-axis direction or a horizontal direction parallel to the bottom surface of the cartridge housing 2020. For unification of terminology, the corresponding direction will be referred to as only the "axial direction of the moving shaft 2050".

The mounter 2034 may be moved along the guide shaft 2100 provided in the cartridge housing 2020 in the axial direction of the moving shaft 2050.

The guide shaft 2100 may penetrate the mounter 2034 in the axial direction of the moving shaft 2050 and may support the mounter 2034.

The transducer 2032 may be mounted on the mounter 2034 to generate ultrasonic waves. The transducer 2032 may not be particularly limited thereto, but may output ultrasonic waves toward the bottom surface of the cartridge housing 2020. Moreover, the transducer 2032 may focus ultrasonic waves to a specific location. Here, a vertical distance from the bottom surface of the cartridge housing 2020 to a specific location where ultrasonic waves are focused may be defined as an ultrasonic focusing depth of the transducer 2032.

The transducer 2032 may be arranged to be relatively movable in a direction approaching or moving away from the mounter 2034. When the transducer 2032 relatively moves in the direction approaching or moving away from the mounter 2034, the ultrasonic focusing depth of the transducer 2032 may be adjusted.

The moving shaft 2050 may move the ultrasonic wave generation module 2030. Here, a direction in which the moving shaft 2050 moves the ultrasonic wave generation module 2030 may be the axial direction of the moving shaft 2050.

The moving shaft 2050 may be moved in the axial direction of the moving shaft 2050 by a driving unit 2090. Here, the moving shaft 2050 may be a screw shaft, and the driving unit 2090 may be a driving motor that rotates a moving nut (not shown) screwed to the screw shaft.

The moving shaft 2050 may move the ultrasonic wave generation module 2030 back and forth. The moving shaft 2050 may be coupled to the ultrasonic wave generation module 2030 to move the ultrasonic wave generation module 2030. For example, the moving shaft 2050 may be coupled to the ultrasonic wave generation module 2030 by coupling a hook groove 2082, which is provided on the moving shaft 2050 and recessed in the adapter 2070, and a hook 2084, which protrudes from the mounter 2034 of the ultrasonic wave generation module 2030 and is to be coupled to the hook groove 2082. The first magnetic member 2040 may be provided in the ultrasonic wave generation module 2030 to generate magnetic force. The first magnetic member 2040 is not particularly limited thereto, but a permanent magnet or an electromagnet may be used.

The first magnetic member 2040 may be provided in the insertion recess 2034a of the mounter 2034.

The second magnetic member 2060 may be provided on the front end part of the moving shaft 2050 and may be coupled to the first magnetic member 2040 by magnetic force. In particular, when the front end part of the moving shaft 2050 is inserted into the insertion recess 2034a of the mounter 2034, the second magnetic member 2060 may be coupled to the first magnetic member 2040 provided in the insertion recess 2034a of the mounter 2034. The second magnetic member 2060 is not particularly limited thereto, but a permanent magnet or an electromagnet may be used.

The adapter 2070 may include the second magnetic member 2060 and may be detachably coupled to the front end part of the moving shaft 2050. The hook groove 2082 and a locking protrusion 2072 may be formed in the adapter 2070.

The coupling unit 2080 may couple the adapter 2070 and the mounter 2034. The coupling unit 2080 may include the hook groove 2082 and the hook 2084.

The hook groove 2082 may be recessed in the adapter 2070. For example, the hook groove 2082 may be recessed in an outer peripheral surface of the adapter 2070 in a ring shape.

The hook 2084 may protrude from the ultrasonic wave generation module 2030 to be coupled to the hook groove 2082. For example, the hook 2084 may protrude from an inner peripheral surface of the mounter 2034 of the ultrasonic wave generation module 2030 in the form of a hook.

When the second magnetic member 2060 provided in the front end part of the moving shaft 2050 is inserted to a location where the second magnetic member 2060 contacts the first magnetic member 2040 provided in the insertion recess 2034a in a process of inserting the front end part of the moving shaft 2050 into the insertion recess 2034a of the mounter 2034, a portion where the hook 2084 protrudes from the mounter 2034 may be formed at a specific location of the mounter 2034 that interlocks with the hook groove 2082 recessed in the adapter 2070.

Accordingly, the moving shaft 2050 and the mounter 2034 are not only primarily coupled by the magnetic coupling of the first magnetic member 2040 and the second magnetic member 2060, but also secondarily coupled by the coupling of the hook 2084 and the hook groove 2082, and thus the moving shaft 2050 and the mounter 2034 may be firmly coupled to each other. When the ultrasonic wave generation module 2030 is moved by the moving shaft 2050, the moving shaft 2050 and the ultrasonic wave generation module 2030 may be prevented from being separated from each other by improving the binding force between the mounter 2034 and the moving shaft 2050 of the ultrasonic wave generation module 2030. Accordingly, it is prevent burns caused because ultrasonic waves output from the transducer 2032 of the ultrasonic wave generation module 2030 are concentrated on a specific part of the skin, by stopping the ultrasonic wave generation module 2030.

In the meantime, in drawings, it is illustrated that the hook groove 2082 is recessed in the adapter 2070 and the hook 2084 protrudes from the mounter 2034. The inventive concept is not limited thereto. The hook groove 2082 may be recessed in the mounter 2034, and the hook 2084 may protrude from the adapter 2070.

Meanwhile, the ultrasonic wave generating device according to an embodiment of the inventive concept may further include a locking groove 2062, a locking protrusion 2072, an auxiliary hook groove 2052, and an auxiliary hook 2074.

The locking groove 2062 may be recessed in the outer periphery of the second magnetic member 2060 at the front end part of the second magnetic member 2060. For example, the locking groove 2062 may be recessed in the outer periphery of the second magnetic member 2060 in a step shape.

The locking protrusion 2072 may protrude along the inner periphery of the adapter 2070 to be engaged with the locking groove 2062. For example, the locking protrusion 2072 may protrude along the inner periphery of the adapter 2070 in a ring shape.

Accordingly, the second magnetic member 2060 may be prevented from being separated from the adapter 2070 by coupling the locking groove 2062 and the locking protrusion 2072.

The auxiliary hook groove 2052 may be recessed in the moving shaft 2050. For example, the auxiliary hook groove 2052 may be recessed along the outer periphery of the moving shaft 2050 in a ring shape.

The auxiliary hook 2074 may protrude from the adapter 2070 to be coupled to the auxiliary hook groove 2052. For example, the auxiliary hook 2074 may protrude along the inner periphery of the adapter 2070 in a ring shape.

Accordingly, the adapter 2070 and the moving shaft 2050 may be coupled to each other to be easily separated from each other by the auxiliary hook groove 2052 and the auxiliary hook 2074.

In the meantime, in drawings, it is illustrated that the auxiliary hook groove 2052 is recessed in the moving shaft 2050 and the auxiliary hook 2074 protrudes from the adapter 2070. The inventive concept is not limited thereto. The auxiliary hook groove 2052 may be recessed in the adapter 2070, and the auxiliary hook 2074 may protrude from the moving shaft 2050.

The joint portion of the mounter 2034 and the moving shaft 2050 may be interposed between a first pipe 2110 and a second pipe 2120.

Each of the first pipe 2110 and the second pipe 2120 may be an expandable corrugated pipe. In addition, the first pipe 2110 and the second pipe 2120 are formed of materials having soft characteristics such as urethane and silicone. Accordingly, the leakage of a medium may be prevented and the reliability of airtightness may be further secured by suppressing the possibility of gaps between the first pipe 2110 and the second pipe 2120.

Hereinafter, an operation of the ultrasonic wave generating device according to an embodiment of the inventive concept will be described.

Figure 21:
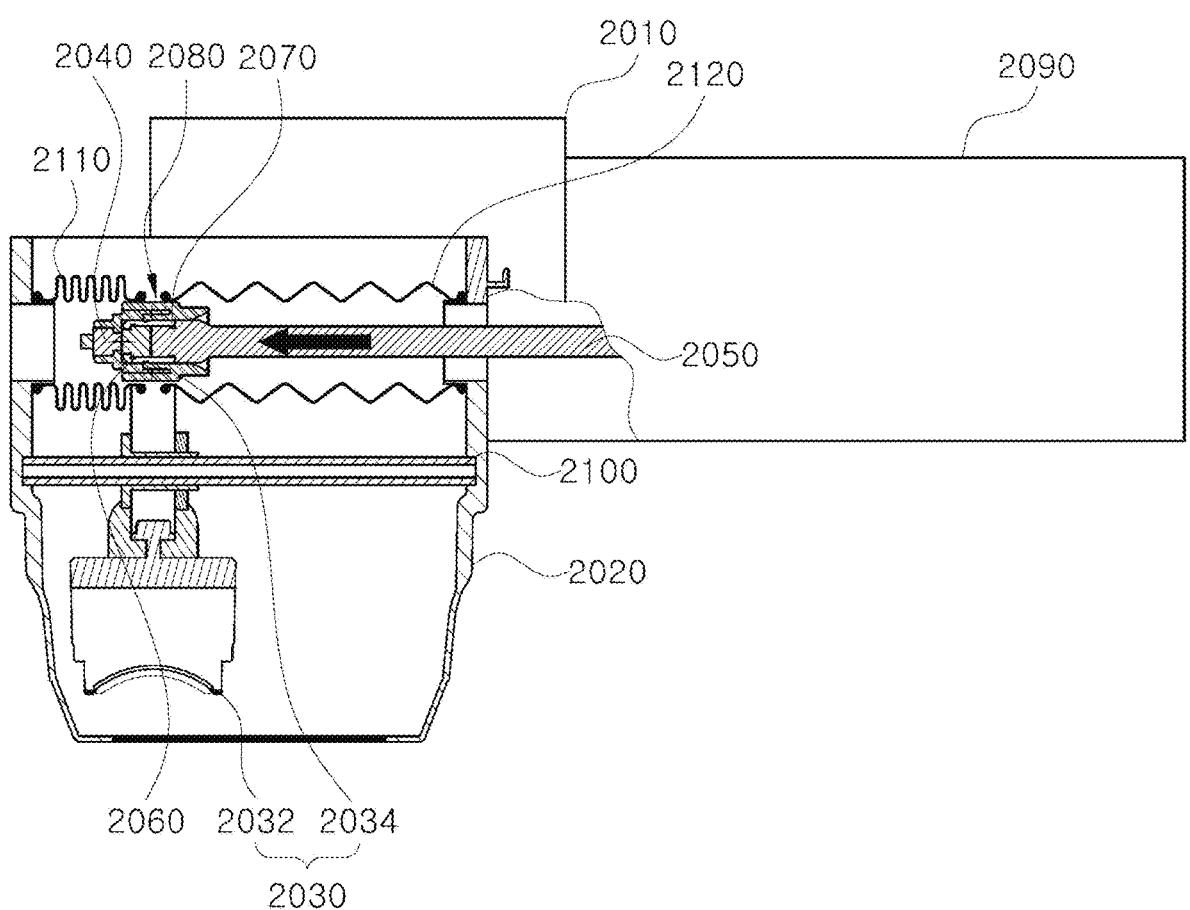
FIG. 21 is a cross-sectional view illustrating a state where a mounter and a transducer in an ultrasonic wave generating device are moved in one direction, according to an embodiment of the inventive concept.
Figure 22:
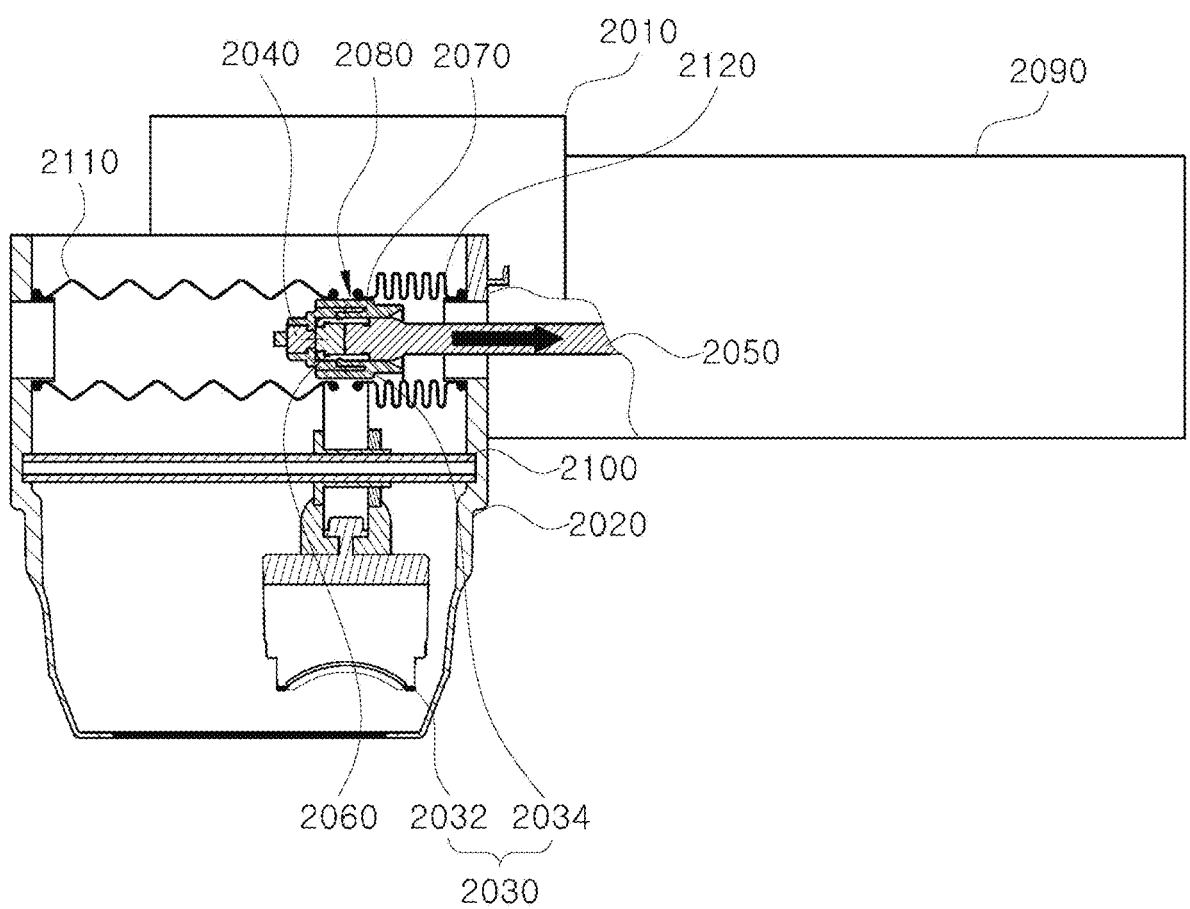
FIG. 22 is a cross-sectional view illustrating a state where a mounter and a transducer in an ultrasonic wave generating device are moved in the other direction, according to an embodiment of the inventive concept.

FIG. 21 is a cross-sectional view illustrating a state where a mounter and a transducer in an ultrasonic wave generating device are moved in one direction, according to an embodiment of the inventive concept. FIG. 22 is a cross-sectional view illustrating a state where a mounter and a transducer in an ultrasonic wave generating device are moved in the other direction, according to an embodiment of the inventive concept.

The processor 122 may control the driving unit 2090 such that the moving shaft 2050 is inserted into an insertion recess 2034a of the ultrasonic wave generation module 2030 of the mounter 2034. In this case, the driving unit 2090 may move the moving shaft 2050 in a direction for inserting the moving shaft 2050 into the insertion recess 2034a of the mounter 2034 of the ultrasonic wave generation module 2030. Afterward, when the second magnetic member 2060 provided in the front end part of the moving shaft 2050 is inserted to a location where the second magnetic member 2060 contacts the first magnetic member 2040 provided in the insertion recess 2034a, the hook 2084 provided on the mounter 2034 may be engaged with the hook groove 2082 recessed in the adapter 2070.

Next, as shown in FIG. 21, the processor 122 may control the driving unit 2090 such that the moving shaft 2050 moves in a direction in which the mounter 2034 of the ultrasonic wave generation module 2030 is pushed. In this case, the driving unit 2090 may move the moving shaft 2050 in a direction in which the mounter 2034 of the ultrasonic wave generation module 2030 is pushed, and the transducer 2032 of the ultrasonic wave generation module 2030 may move in a direction in which the moving shaft 2050 is pushed, and may output ultrasonic waves to a target site of skin.

Then, as shown in FIG. 22, the processor 122 may control the driving unit 2090 such that the moving shaft 2050 moves in a direction in which the mounter 2034 of the ultrasonic wave generation module 2030 is pulled. In this case, the driving unit 2090 may move the moving shaft 2050 in a direction in which the mounter 2034 of the ultrasonic wave generation module 2030 is pulled, and the transducer 2032 of the ultrasonic wave generation module 2030 may move in a direction in which the moving shaft 2050 is pulled, and may output ultrasonic waves to a target site of skin.

While the ultrasonic wave generation module 2030 moves back and forth in a direction in which the moving shaft 2050 pushes and pulls the ultrasonic wave generation module 2030, or the ultrasonic wave generation module 2030 moves back and forth in a direction in which the moving shaft 2050 pulls and pushes the ultrasonic wave generation module 2030, the processor 122 may control the driving unit 2090 and the transducer 2032 of the ultrasonic wave generation module 2030 such that, while moving back and forth, the transducer 2032 of the ultrasonic wave generation module 2030 outputs ultrasonic waves at regular intervals to the target site of the skin to form a plurality of damaged areas.

The processor 122 may control the driving unit 2090 and the transducer 2032 of the ultrasonic wave generation module 2030 such that, after the transducer 2032 of the ultrasonic wave generation module 2030 outputs ultrasonic waves at regular intervals to the target site of the skin to form a plurality of damaged areas when the ultrasonic wave generation module 2030 moves in a direction in which the moving shaft 2050 pushes the ultrasonic wave generation module 2030, the transducer 2032 of the ultrasonic wave generation module 2030 outputs ultrasonic waves to the plurality of damaged areas to form a plurality of auxiliary damaged areas when the ultrasonic wave generation module 2030 moves in a direction in which the moving shaft 2050 pulls the ultrasonic wave generation module 2030.

While the ultrasonic wave generation module 2030 moves back and forth in a direction in which the moving shaft 2050 pushes and pulls the ultrasonic wave generation module 2030, or the ultrasonic wave generation module 2030 moves back and forth in a direction in which the moving shaft 2050 pulls and pushes the ultrasonic wave generation module 2030, the processor 122 may control the driving unit 2090 and the transducer 2032 of the ultrasonic wave generation module 2030 such that, while moving back and forth, the transducer 2032 of the ultrasonic wave generation module 2030 continuously outputs ultrasonic waves to the target site of the skin to form a single damaged area.

When the ultrasonic wave generation module 2030 moves in the direction in which the moving shaft 2050 pushes the ultrasonic wave generation module 2030, the processor 122 may increase the intensity of ultrasonic waves that the transducer 2032 of the ultrasonic wave generation module 2030 outputs to the target site of skin. When the ultrasonic wave generation module 2030 moves in the direction in which the moving shaft 2050 pulls the ultrasonic wave generation module 2030, the processor 122 may decrease the intensity of the ultrasonic waves that the transducer 2032 of the ultrasonic wave generation module 2030 outputs to the target site of the skin. As a result, as a specific amount of ultrasound is delivered to each target site on the skin, coagulative necrosis may be prevented from occurring when too little ultrasonic waves are delivered to each target site on the skin, or from burns occurring when too much ultrasonic waves are delivered to each target site on the skin.

Accordingly, in an ultrasonic wave generating device according to an embodiment of the inventive concept, the moving shaft and the ultrasonic wave generation module may be prevented from being separated from each other while the ultrasonic wave generation module is moving, by improving the coupling between the ultrasonic wave generation module and the moving shaft. Besides, it is possible to prevent burns caused because ultrasonic waves output from the transducer of the ultrasonic wave generation module is concentrated on a specific site of skin due to the poor movement of the ultrasonic wave generation module.

At least one component may be added or deleted to correspond to the performance of components shown in FIGS. 1 and 10. Furthermore, it will be easily understood by those skilled in the art that mutual locations of components may be changed to correspond to the performance or structure of a system.

FIGS. 4, 8, and 11 illustrate that a plurality of steps are performed sequentially. However, this is merely illustrative of the technical idea of the inventive concept. Those skilled in the art to which an embodiment of the inventive concept belongs may apply various modifications and variations by changing and performing the order illustrated in FIG. 4 or performing one or more of steps among the plurality of steps in parallel without departing from the essential characteristics of an embodiment of the inventive concept. The embodiment in FIG. 4 is not limited to a time-series order.

Disclosed embodiments are described above with reference to the accompanying drawings. One ordinary skilled in the art to which the inventive concept belongs will understand that the inventive concept may be practiced in forms other than the disclosed embodiments without altering the technical ideas or essential features of the inventive concept. The disclosed embodiments are examples and should not be construed as limited thereto.

According to the above-mentioned problem solving means of the inventive concept, an apparatus may maximize ultrasonic wave irradiation effects while shortening an ultrasonic wave irradiation time.

Moreover, according to the above-mentioned problem solving means of the inventive concept, the apparatus may prevent the risk of burns in advance.

Furthermore, according to the above-mentioned problem solving means of the inventive concept, the apparatus may irradiate ultrasonic surface waves to a deep part of skin and may irradiate ultrasonic waves to a relatively large area in the deep part of skin at once.

Besides, according to the above-mentioned problem solving means of the inventive concept, the apparatus may prevent an ultrasonic wave generating unit from being separated while the ultrasonic wave generating unit is moving.

Also, according to the above-mentioned problem solving means of the inventive concept, the apparatus may prevent burns caused by focusing ultrasonic waves output from a transducer on a specific area of a skin.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:
1. A system, comprising:
an ultrasonic wave generator configured to generate ultrasonic waves for skin treatment;
one or more actuators configured to move the ultrasonic wave generator along a movement path; and a processor configured to control the ultrasonic wave generator and the one or more actuators;

wherein the processor is configured to control the ultrasonic wave generator to irradiate a patient's skin with ultrasonic waves at intervals along the movement path of the ultrasonic wave generator and to provide a rest period in a turning section of the movement path of the ultrasonic wave generator during which the irradiation of ultrasonic waves is stopped;

wherein irradiating the patient's skin with ultrasonic waves at intervals along the movement path and providing the rest period in the turning section comprises:
moving the ultrasonic wave generator to a plurality of locations between a first point and a second point and irradiating each of the plurality of locations; and
after the ultrasonic wave generator reaches the second point, moving the ultrasonic wave generator to the same plurality of locations between the second point and the first point in reverse order, wherein during the movement in the reverse order, one or more locations of the plurality of locations closest to the second point are not irradiated, and the remaining locations of the plurality of locations are each irradiated, and wherein the one or more locations of the plurality of locations closest to the second point are part of the turning section of the movement path of the ultrasonic wave generator.

2. The system of claim 1, further comprising:
a memory configured to store ultrasonic wave irradiation location information for the ultrasonic wave generator which is set in advance;
wherein controlling the ultrasonic wave generator to irradiate the patient's skin with ultrasonic waves at intervals along the movement path of the ultrasonic wave generator is based on the ultrasonic wave irradiation location information.

3. The system of claim 1, wherein the one or more actuators include a first actuator and a second actuator; and
wherein the system further comprises:
a cartridge housing in which the ultrasonic wave generator is provided;
a handpiece on which the cartridge housing is detachably mounted and in which the first and second actuators are is-provided;
a main shaft coupled to the ultrasonic wave generator, wherein the main shaft is configured to be actuated horizontally by the first actuator and to be actuated vertically by the second actuator;
an auxiliary shaft, which is accommodated in the cartridge housing, which is positioned to be parallel to the main shaft, and which is configured to guide the ultrasonic wave generator with respect to vertical movement and horizontal movement; and
a guide provided in the vertical direction between the handpiece and a movable plate, wherein the guide is configured to guide the movable plate such that the movable plate is capable of moving in a vertical direction via the second actuator.

4. The system of claim 1, further comprising:
a moving shaft configured to move the ultrasonic wave generator;
an adapter provided on the moving shaft;
a hook groove recessed in one of the ultrasonic wave generator and the adapter; and
at least one hook protruding from the other of the adapter and the ultrasonic wave generator, wherein the at least one hook is coupled to the hook groove.

5. The system of claim 4, further comprising:
a first magnetic member provided in the ultrasonic wave generator; and
a second magnetic member provided in the adapter, wherein the adapter is detachably coupled to a front end part of the moving shaft, and wherein the second magnetic member is coupled to the first magnetic member by magnetic force.

6. The system of claim 4, wherein the ultrasonic wave generator includes:
a mounter detachably coupled to the moving shaft; and
wherein the ultrasonic wave generator is provided on the mounter.

7. The system of claim 6, wherein the one or more actuators are:
configured to move the moving shaft.

8. The system of claim 7, wherein irradiating the patient's skin with ultrasonic waves at intervals along the movement path of the ultrasonic wave generator forms
a plurality of damaged areas in the patient's skin.

9. The system of claim 7, wherein irradiating the patient's skin with ultrasonic waves at intervals along the movement path of the ultrasonic wave generator forms
a single damaged area in the patient's skin.

10. A system, comprising:
an ultrasonic wave generator configured to generate ultrasonic waves for skin treatment;
one or more actuators configured to move the ultrasonic wave generator along a movement path; and
a processor configured to control the ultrasonic wave generator and the one or more actuators;
wherein the processor is configured to control the ultrasonic wave generator to irradiate a patient's skin with ultrasonic waves at intervals along the movement path of the ultrasonic wave generator a cartridge housing in which the ultrasonic wave generating unit is provided;
wherein the one or more actuators include a first actuator and a second actuator; and
wherein the system further comprises:
a cartridge housing in which the ultrasonic wave generator is provided;
a handpiece on which the cartridge housing is detachably mounted and in which the first and second actuators are provided;
a main shaft coupled to the ultrasonic wave generator, wherein the main shaft is configured to be actuated horizontally by the first actuator and to be actuated vertically by the second actuator;
an auxiliary shaft, which is accommodated in the cartridge housing, which is positioned to be parallel to the main shaft, and which is configured to guide the ultrasonic wave generator with respect to vertical movement and horizontal movement; and
a guide provided in the vertical direction between the handpiece and a movable plate, wherein the guide is configured to guide the movable plate such that the movable plate is capable of moving in a vertical direction via the second actuator.

11. The system according to claim 10, wherein the first and second actuators comprise motors.

12. The system according to claim 10, wherein the processor is further configured to control the ultrasonic wave generator to provide a rest period in a turning section of the movement path of the ultrasonic wave generator during which the irradiation of ultrasonic waves is stopped; and wherein irradiating the patient's skin with ultrasonic waves at intervals along the movement path and providing the rest period in the turning section comprises:

moving the ultrasonic wave generator to a plurality of locations between a first point and a second point and irradiating each of the plurality of locations; and after the ultrasonic wave generator reaches the second point, moving the ultrasonic wave generator to the same plurality of locations between the second point and the first point in reverse order, wherein during the movement in the reverse order, one or more locations of the plurality of locations closest to the second point are not irradiated, and the remaining locations of the plurality of locations are each irradiated, and wherein the one or more locations of the plurality of locations closest to the second point are part of the turning section of the movement path of the ultrasonic wave generator.

13. The system of claim 10, further comprising:

a memory configured to store ultrasonic wave irradiation location information for the ultrasonic wave generator which is set in advance;

wherein controlling the ultrasonic wave generator to irradiate the patient's skin with ultrasonic waves at intervals along the movement path of the ultrasonic wave generator is based on the ultrasonic wave irradiation location information.

14. The system of claim 10, further comprising:

a memory configured to store ultrasonic wave irradiation location information for the ultrasonic wave generator which is set in advance;

wherein controlling the ultrasonic wave generator to irradiate the patient's skin with ultrasonic waves at intervals along the movement path of the ultrasonic wave generator is based on the ultrasonic wave irradiation location information.

15. The system of claim 10, wherein the movement path includes movement back and forth between a first point and a second point.

16. The system of claim 15, wherein the processor is configured to control the ultrasonic wave generator to irradiate a same point during movement from the first point to the second point and during movement from the second point to the first point.

17. The system of claim 15, wherein the processor is configured to control the ultrasonic wave generator to irradiate different points during movement from the first point to the second point relative to during movement from the second point to the first point.

18. The system of claim 10, wherein irradiating the patient's skin with ultrasonic waves at intervals along the movement path of the ultrasonic wave generator forms a plurality of damaged areas in the patient's skin.

19. The system of claim 10, wherein irradiating the patient's skin with ultrasonic waves at intervals along the movement path of the ultrasonic wave generator forms a single damaged area in the patient's skin.

* * * * *